US007531089B2

(12) United States Patent
Mankiewicz

(10) Patent No.: US 7,531,089 B2
(45) Date of Patent: May 12, 2009

(54) BIOGEOCHEMICAL REACTOR

(76) Inventor: Paul S. Mankiewicz, 99 Bay St., City Island, NY (US) 10464

(*) Notice: Subject to any disclaimer, the term of this patent is extended or adjusted under 35 U.S.C. 154(b) by 0 days.

(21) Appl. No.: 12/002,552

(22) Filed: Dec. 18, 2007

(65) Prior Publication Data
US 2008/0210629 A1 Sep. 4, 2008

Related U.S. Application Data

(60) Provisional application No. 60/875,424, filed on Dec. 18, 2006.

(51) Int. Cl.
C02F 3/00 (2006.01)
(52) U.S. Cl. .............. 210/170.01; 210/170.09; 210/170.1; 210/170.11
(58) Field of Classification Search ........... 210/170.01, 210/170.09, 170.1, 170.11, 610–611
See application file for complete search history.

(56) References Cited

U.S. PATENT DOCUMENTS

| | | | |
|---|---|---|---|
| 3,302,412 A | 2/1967 | Hunsucker | |
| 5,163,875 A | 11/1992 | Takeuchi | |
| 5,320,454 A | 6/1994 | Walling | |
| 5,437,520 A | 8/1995 | Cherry et al. | |
| 5,549,828 A * | 8/1996 | Ehrlich | 210/602 |
| 5,921,796 A | 7/1999 | Morlion et al. | |
| 5,938,375 A | 8/1999 | Wheeler, Jr. et al. | |
| 6,664,298 B1 * | 12/2003 | Reinhart et al. | 516/22 |
| 2003/0092583 A1 * | 5/2003 | Luthy et al. | 507/200 |
| 2006/0057705 A1 * | 3/2006 | Sowers et al. | 435/262.5 |
| 2007/0112243 A1 * | 5/2007 | Quinn et al. | 588/313 |
| 2008/0011207 A1 * | 1/2008 | Kryzak | 111/100 |

OTHER PUBLICATIONS

L. Adrian et al., "Anaerobic Transformation of Chlorinated Dioxins by Microorganisms", Biological and Photolytic Transformations, Organohalogen Compounds, 2004, pp. 2266-2271, vol. 66.
A. Barkovskii et al., "Microbial Dechlorination of Historically Present and Freshly Spiked Chlorinated Dioxins and Diversity of Dioxin-Dechlorinating Populations", Applied and Environmental Microbiology, 1996, pp. 4556-4562, vol. 62, No. 12.
C. Vargas et al., "Anaerobic Reductive Dechlorination of Chlorinated Dioxins in Estuarine Sediments", Appl. Microbiol. Biotechnol. (2001), pp. 786-790, vol. 57.

(Continued)

Primary Examiner—Chester T Barry
(74) Attorney, Agent, or Firm—Edwards Angell Palmer & Dodge LLP; Howard Gitten

(57) ABSTRACT

A new and improved in situ biogeochemical reactor, methods for constructing such reactors, and methods for using such reactors, for biodegradation, detoxification and mineralization of toxic organic and inorganic compounds, especially dioxins, in contaminated geologic settings, such as waterways is disclosed. The system includes both an anaerobic component and an aerobic component that are coupled to each other. The system is enriched with carbon, nutrients and growth factors in sufficient amounts to establish a full spectrum oxidation-reduction gradient thereby enabling, promoting and providing indigenous microbial populations to biodegrade, detoxify, and mineralize toxic organic and inorganic compounds in a contaminated geological site.

10 Claims, 7 Drawing Sheets
(5 of 7 Drawing Sheet(s) Filed in Color)

OTHER PUBLICATIONS

P. Adriaens et al., "Reductive Dechlorination of PCDD/F by Anaerobic Cultures and Sediments", Chemosphere, 1994, pp. 2253-2259, vol. 29, No. 9-11.

P. Adriaens et al., "Bioavailability and Transformation of Highly Chlorinated Dibenzo-*p*-dioxins and Dibenzofurans in Anaerobic Soils and Sediments", Environmental Science & Technology, 1995, pp. 2252-2260, vol. 29, No. 9.

P. Adriaens et al. "Dechlorination of PCDD/F by Organic and Inorganic Electron Transfer Molecules in Reduced Environments", Chemosphere, 1996, pp. 433-441, vol. 32, No. 3.

H. Ballerstedt et al. "Properties of a Trichlorodibenzo-p-dioxin-dechlorinating Mixed Culture with a Dehalococcoides as Putative Dechlorinating Species," FEMS Microbiology Ecology 41, 2004, pp. 223-234.

M. Bunge et al. "Reductive Dehalogenation of Chlorinated Dioxins by an Anaerobic Bacterium," Letters to Nature, 2003, pp. 357-360, vol. 421.

M. Bunge et al. "Enrichment of Dioxin-Dehalogenating Bacteria by a Two-Liquid-Phase System with 1,2,3-Trichlorobenezene," Article submitted for publication, pp. 95-125, undated.

Y. Cho et al. "Microbial PCB Dechlorination in Dredged Sediments and the Effect of Moisture," Chemosphere, 2001, pp. 1119-1126, vol. 43.

N. Yoshida et al. "Phylogenetic Characterization of a Polychlorinated-Dioxin-Dechlorinating Microbial Community by Use of Microcosm Studies," Applied and Environmental Microbiology, 2005, pp. 4325-4334, vol. 71, No. 8.

M. Connor et al. "Dioxins in San Francisco Bay," 2004, Conceptual Model/ Impairment Assessment, pp. 1-60.

J. Field, "Review of Scientific Literature on Microbial Dechlorination and Chlorination of Key Chlorinated Compounds," 2001, Quarterly Report prepared for EUROCHLOR.

Q. S. Fu et al. "Dioxin Cycling in Aquatic Sediments: the Passaic River Estuary," Chemosphere, 2001.

"Managing Sediments- How Much Cleanup is Really Needed?," Centerpoint, 1999, pp. 1-15, vol. 5, No. 1.

R. Halden et al. "Removal of Dibenzofuran, Dibenzo-P-Dioxin, and 2-Chlorodibenzo-P-Dioxin from Soils Inoculated with *Sphingomonas* sp. Strain RW1," Applied and Environmental Microbiology, 1999, pp. 2246-2249, vol. 65, No. 5.

V. Strubel et al. "3-(2-Hydroxyphenyl) Catechol as Substrate for Proximal meta Ring Cleavage in Dibenzofuran Degradation by *Brevibacterium* sp. Strain DPO 1361," Journal of Bacteriology, 1991 pp. 1932-1937, vol. 173, No. 6.

C.M. Kao et al. "Evaluation of TCDD Biodegradability Under Different Redox Conditions," Chemosphere, 2001, pp. 1447-1454, vol. 44.

L. Monna et al. "Microbial Degradation of Dibenzofuran, Fluorene, and Dibenzo-P-Dioxin by *Staphylococcus auriculans* DBF63," Applied and Environmental Microbiology, 1993, pp. 285-289, vol. 59, No. 1.

E. Monserrate et al. "Dehalogenation and Biodegradation of Brominated Phenols and Benzoic Acids under Iron-Reducing, Sulfidogenic, and Methanogenic Conditions," Applied and Environmental Microbiology, 1997, pp. 3911-3915, vol. 63, No. 10.

M.R. Natarajan et al. "Dechlorination of Spiked PCBS in Lake Sediment by Anaerobic Microbial Granules," Wat. Res., 1998, pp. 3013-3020, vol. 32, No. 10.

"Natural Attenuation of Contaminated Soil and Ground Water at Agricultural Chemical Incident Sites," Minnesota Department of Agriculture- Pesticide & Fertilizer Division- Guidance Document 20, 2005.

S. Takada et al. "Degradation of Polychlorinated Dibenzo-p-Dioxins and Polychlorinated Dibenzofurans by the White Rot Fungus *Phanerochaete sordida* YK-624," Applied and Environmental Microbiology, 1996, pp. 4323-4328, vol. 62, No. 12.

R.M. Wittich et al. "Degradation of Dioxin-Like Compounds by Microorganisms," Appl. Microbiol. Biotechnol. 1998, pp. 489-499, vol. 49.

R.M. Wittich et al. "Metabolism of Dibenzo-P-Dioxin by *Sphingomonas* sp. Strain RW1," Applied and Environmental Microbiology, 1992, pp. 1005-1010, vol. 58, No. 3.

G. Mason et al. "Polycholorinated dibenzo-p-dioxins: Quantitative in vitro and in vivo structure-activity relationships," Toxicology, 1986, pp. 21, vol. 41.

Environ. Sci. Technol., 1995, pp. 24A-35A, vol. 29.

* cited by examiner

BIOGEOCHEMICAL REACTOR

CROSS-REFERENCE TO RELATED APPLICATION AND INCORPORATION BY REFERENCE

This application claims priority to U.S. Provisional Patent Application Ser. No. 60/875,424, filed on Dec. 18, 2006, and which is incorporated herein by reference. All documents cited or referenced in this application, together with any manufacturer's instructions, descriptions, product specifications, and product sheets for any products mentioned in this application or in any document incorporated by reference herein, are incorporated by reference, and may be employed in the practice of the invention.

BACKGROUND OF THE INVENTION

1. Field of the Invention

The present invention relates to the field of bioremediation. More particularly, the present invention relates to an in situ bioremediation system and method thereof for biodegradation, detoxification and mineralization of toxic organic and inorganic compounds, especially dioxins and polychlorinated biphenyls, in a contaminated geologic setting.

2. Description of the Related Art

Waterway contamination, including contamination of both the water column and associated underlying sediments, is a widespread problem in the United States and around the world which can be attributed largely to the development of industry along such waterway systems. Historically, waterways, such as harbors, lakes, rivers, and estuaries, provided convenient sites for the growth of many types of industries due the convenience and availability of water-based transportation, power, and waste disposal options. Contamination of waterway sediments and water columns became widespread because of the unfortunate perception that the water was an endless sink for the deposal of industrial wastes. Today, while American industrial facilities continue to generate and dispose of approximately 7.6 billion tons of industrial solid waste each year, there are clearly more government regulations, monitoring and procedures in place to ensure the proper disposal and management of environmental risks to protect our waters, lands and natural resources. Nevertheless, further improvements in industrial waste management are needed and especially, there is a demand for eradicating, mitigating and managing hazardous waste contamination from yesteryear.

Historically, many industrial facilities were built on estuary-based geologic sites, including salt marshes, mudflats, shellfish beds and reefs. Estuaries are partially enclosed coastal bodies of water, having an open connection with the ocean, where freshwater from inland is mixed with saltwater from the sea. For example, Chesapeake Bay is an estuary. This system is one of the largest estuaries in the United States and was formed during the melting of the Pleistocene ice sheets. Fjords, or drowned glacial troughs, form similar types of estuaries, particularly in colder regions such as Norway, Alaska, New Zealand, and other glaciated, mountainous coastal regions. Salt marshes and lagoons found behind barrier beaches, such as along the south shore of Long Island, N.Y. and down faulted sections of the earth's crust, such as San Francisco Bay, are additional types of estuaries.

Estuaries represent one of the most sensitive and ecologically important habitats on earth. They provide sanctuary for many species of waterfowl, store and cycle nutrients for larval and juvenile marine life, and serve as breeding grounds for many desirable species of marine ocean fish. Further, estuaries, in particular salt marshes, are regarded as among the most productive ecosystems on the planet, producing more organic matter per unit area than most forests, grasslands, and cultivated fields. As a result of their high productivity and interactions with the coastal ocean, salt marshes provide numerous societal benefits, including habitat for commercially harvested marine and estuarine biota and a natural filter for nutrients, pollutants and sediments from the water column. In addition, estuary-based geologic sites commonly provide excellent harbors. Indeed, most of the large ports in the United States, for example, New York, Philadelphia, Baltimore, Mobile, Galveston, Seattle, and San Francisco, are located in estuaries.

The development, however, of high-density population centers near these ports has caused deleterious effects on estuary environments that can destroy the very properties of the estuary that made development of those regions possible. Human impact on estuaries includes reclamation of tidal land by filling, pollution from sewage, solid waste, industrial effluent and hazardous wastes, and hot water, increased sedimentation filling the estuary, and alteration of the salinity of estuarine waters by withdrawal or increased influx of freshwater. Increasingly, federal and state governments are passing legislation to protect estuarine environments however, such environments are still faced with many past and present environmental risks posed by the industrial world.

One notorious and highly contaminated geologic site formed as a result of industrial waste activities is the Passaic River in New Jersey. The contamination in the Passaic River include high levels of dioxins and other contaminants in the sediments as a result of years of discharge of industrial effluents, sewer discharge and wastewater discharge by industries, such as, Diamond Shamrock which was linked to the production of Agent Orange, a dioxin-containing herbicide used by U.S. forces during the Vietnam War to expose forested areas.

The term dioxin refers to a family of halogenated organic compounds, the most common consisting of polychlorinated dibenzofurans (PCDFs) and polychlorinated dibenzodioxins (PCDDs), are regarded as some of the most toxic compounds on the planet and are linked to a variety of diseases, including cancer, developmental abnormalities in tooth enamel, negative impact on immune system function, endometriosis, birth defects, and diabetes. More in particular, diseases associated with dioxin exposure are chloracne, soft tissue sarcomas, Hodgkin's disease, and non-Hodgkin's disease. Diseases with limited evidence of an association with Agent Orange are respiratory cancers, prostate cancer, multiple myeloma, Porphyria cutanea tarda (a type of skin disease), acute and subacute transient peripheral neuropathy, spina bifida, Type 2 diabetes, and acute myelogenous leukemia found only in the second or third generation. Diseases with inadequate or insufficient evidence of an association are hepatobiliary cancers, nasal or nasophargyngeal cancers, bone cancer, female reproductive cancers, renal cancer, testicular cancer, leukemia, spontaneous abortion, birth defects, neonatal or infant death and stillbirths, low birth weight, childhood cancers, abnormal sperm parameters, cognitive neuropsychiatric disorders, ataxia, peripheral nervous system disorders, circulatory disorders, respiratory disorders, skin cancers, urinary and bladder cancer. Diseases with limited or suggestive evidence of no association are gastrointestinal tumors such as stomach cancer, pancreatic cancer, colon cancer, and rectal cancer, and brain tumors.

The basic structure of PCDD/Fs includes two benzene rings joined by either a single (furan) or a double oxygen bridge (dioxin). Chlorine atoms are attached to the basic structure at any of 8 different places on the molecule, numbered from 1 to 10. There are 210 different PCDD/F congeners, comprising of 75 PCDDs and 135 PCDFs. The toxicity of PCDD/Fs is dependent on the number and position of the chlorine atoms, wherein congeners having chlorines in the 2,3,7, and 8 positions have been observed to have toxicity. Out of the 210 PCDD/F compounds in total, only 17 congeners (7 PCDDs and 10 PCDFs) have chlorine atoms in the relevant positions to be considered toxic by the NATO/CCMS international toxic equivalent (I-TEQ) scheme. 2,3,7,8-Tetrachloro dibenzene-para-dioxin is the most toxic of the congeners.

Dioxins can bioaccumulate in tissues over time and thus, even small exposures may accumulate to dangerous levels. The toxicity of dioxins is thought to be linked to the similarity of these compounds to natural hormones. Like hormones, dioxins have the ability to pass through cellular membranes and bind to neural receptors. By doing so, a dioxin molecule can literally alter the genetic structure of the cell, creating new instructions that can interfere and disrupt the immune, neurological, and cellular systems. Dioxins are also capable of remaining in tissues for very long periods of time, a trait that enhances their toxicity. The body does not remove dioxins and thus, its effects can be ongoing and long-term. Moreover, unlike most other toxins, dioxins do not require a minimal dose to be harmful.

Dioxins are produced in a variety of industrial processes where organic material is burned in the presence of chlorine, including sources such as trash burn barrels, land application of sewage sludge, coal fired utilities, residential wood burning, metal smelting and diesel trucks, together which account for nearly 80% of dioxin emissions. In incineration processes, dioxins can also reform in the atmosphere above the stack as the exhaust gases cool through a temperature window of 600° C. to 200° C., however, new emissions control technologies now make this route a minor contributor to dioxin emissions. Dioxins are also generated in reactions that do not involve burning, such as bleaching fibers for paper or textiles, and in the manufacture of chlorinated phenols, particularly when reaction temperature is not well controlled. Affected compounds include the wood preservative pentachlorophenol, and also herbicides such as 2,4-dichlorophenoxyacetic acid (or 2,4-D) and 2,4,5-trichlorophenoxyacetic acid (2,4,5-T).

The Environmental Protection Agency Dioxin Reassessment Report, incorporated herein in its entirety, is a comprehensive review of dioxin, its sources, and impacts on human and animal health. Other countries, including Australia, New Zealand, and the United Kingdom, also have substantial similar research. Tolerable daily, monthly or annual intakes have been set by the World Health Organization and a number of governments.

While research over the past two decades has produced a body of knowledge demonstrating bioremediation of toxic hydrocarbons, dioxins, metals, nitrogen-based compounds and other contaminants produced by industrial America and accumulated in our waterway sediments, water columns, and wetland environments, a full reversal or effective mitigation of this contamination will require new and dynamic approaches to restore contaminated sites such as the Passaic River. In particular, while bioremediation of contaminated waterways, sediments, soils, groundwater sites, lakes, ponds, aquifers, wells, shore fronts, oceans and the like have been demonstrated in various approaches to varying degrees of success, there is a need to develop large-scale in situ bioremediation systems that target toxic organic and inorganic compounds, including dioxins and PCB's, that are effective at reducing, mitigating or removing sediment and water-column contaminants particularly in waterway and estuary systems. Such new approaches also advantageously should be integrated with improvements in waterway infrastructures, such as roadways, piers, and bridges, for facilitating positive economic effects to contaminated geologic sites. Further, such improved approaches should bring about positive restorative effects on estuary systems, such as the restoration of important salt marsh conditions and biota.

A bibliography of references is included at the end of the specification. The specification refers to these references by the first author's name and publication date. The references listed in the bibliography, to the extent they provide exemplary procedural or other details supplementary to those set forth herein, including both material or immaterial support, are specifically incorporated herein by reference.

Citation or identification of any document in this application is not an admission that such document is available as prior art to the present invention.

BRIEF SUMMARY OF THE INVENTION

The present invention relates to a new and improved bioremediation system and methods for biodegradation, detoxification, and mineralization of unwanted toxic organic and inorganic contaminants from a geologic site that comprises a sediment column component together with a salt marsh component wherein the sediment column component and salt marsh component comprise indigenous microbial populations that are capable of bioremediation of the toxic contaminants in the presence of an effective amount of supplemental carbon, nutrients and growth factors.

In another aspect, the present invention relates to an in situ bioremediation system for carrying out biodegradation, detoxification, and mineralization of dioxins and other contaminants from a waterway geologic site, the system comprising a sediment component coupled to a salt marsh component, the system enriched with an effective amount of carbon, nutrients and growth factors to establish a full spectrum oxidation-reduction gradient among the indigenous microbial populations present therein, wherein the microorganisms are capable of mineralizing and degrading the dioxins and other contaminants in the presence of the full spectrum oxidation-reduction gradient.

Another aspect of the present invention relates to a method of establishing a full spectrum oxidation-reduction gradient in an in situ bioremediation system that supports a full range of microbial physiologies and respirations, including methanogenesis, sulfate reduction, dissimilatory metal reduction, nitrate reduction, and aerobic respiration and which is capable of biodegradation and mineralization of dioxin and other contaminants in waterway sediments. The method can comprise the steps of coupling a salt marsh component and a sediment component, the sediment component comprising an effective amount of carbon, nutrients and growth factors sufficient to establish a full-spectrum oxidation-reduction gradient across the salt marsh and sediment column components, the sediment component being configured in an effective spatial manner to maximize the biotic and abiotic degradation and mineralization of the contaminants in the waterway sediments and water column.

In still another aspect of the present invention, a method is provided for preparing an in situ bioremediation system for carrying out biodegradation, detoxification, and mineralization of dioxins and other contaminants from a waterway geologic site, the system comprising a sediment component coupled to a salt marsh component, the system enriched with an effective amount of carbon, nutrients and growth factors to establish a full spectrum oxidation-reduction gradient among the indigenous microbial populations present therein, wherein the microorganisms are capable of mineralizing and degrading the dioxins and other contaminants in the presence of, and by establishing the full spectrum of oxidation-reduction gradient.

A further aspect of the present invention provides a method for concomitantly constructing an in situ bioremediation system comprising a contaminated sediment component and a salt marsh component and improving the infrastructure of a contaminated waterway. The sediment component can comprise an effective amount of carbon, nutrients and growth factors sufficient to establish a full-spectrum oxidation-reduction gradient across the salt marsh and sediment components. The sediment component can be configured in an effective spatial manner to maximally promote the biotic and abiotic degradation and mineralization of the contaminants in the waterway sediments and water column.

In another aspect, the present invention relates to a method for bioremediation of contaminated waterway sediments and water column by coupling the restoration of estuary salt marsh environment with the establishment of a full-spectrum of biogeochemical reactions in the contaminated sediments that are capable of mineralizing and degrading dioxins and other contaminants.

In yet another aspect, the present invention relates to a method for bioremediation of a contaminated geologic site comprising dioxins and other contaminants comprising the steps of (a) constructing a bioremediation system comprising (i) a sediment component having a first indigenous consortia of microorganisms, (ii) a salt marsh component coupled to the sediment component, said salt marsh component having a second indigenous consortia of microorganisms, and (iii) said bioremediation system supplemented with an effective amount of carbon, nutrients and growth factors to sufficiently establish a full spectrum oxidation-reduction gradient among the first and second indigenous microbial consortia present therein, and (b) operating the bioremediation system for a sufficient amount of time to mineralize and degrade the dioxins and other contaminants present in the sediment and water column. In a further aspect, where sediments are or may be made to be sufficiently stable, an enriched sediment column may be used with the sediment-water interface as the more oxidized portion of the established oxidation-reduction gradient.

The coupled salt marsh and sediment components can comprise sectors or zones of microorganisms or microbial consortia capable of carrying out a full range of microbial physiologic and respiratory processes, from strictly anaerobic to facultative aerobic to strict aerobic, including, methanogenesis, sulfate reduction, dissimilatory metal reduction, and nitrate reduction and oxygen reduction. The bioremediation system can also comprise both biotic and abiotic processes together which can contribute to carrying out the mineralization and removal of the dioxins and other contaminants from the contaminated sediments and water column.

In another aspect, the bioremediation system comprises a methanogenesis sector that is substantially proximal to a sulfate reduction sector thereby enhancing dioxin dechlorination and degradation and minimizing the inhibitory effect on dioxin dechlorination/degradation by sulfate.

In yet another aspect, the bioremediation system comprises humic materials which are substantially separated from sulfate reduction sectors thereby promoting the sequestering of the metals by the humic materials and thereby minimizing the risk of metals reaching the water column. The humic materials can be from any known source, including, for example, sludge cake or compost.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

This nonprovisional patent application contains at least one drawing executed in color. Copies of this nonprovisional patent application with color drawings will be provided by the Office upon request and payment of the necessary fee. The following detailed description, given by way of example, but not intended to limit the invention solely to the specific embodiments described, may best be understood in conjunction with the accompanying drawings, in which.

DETAILED DESCRIPTION OF THE INVENTION

Figure 1:
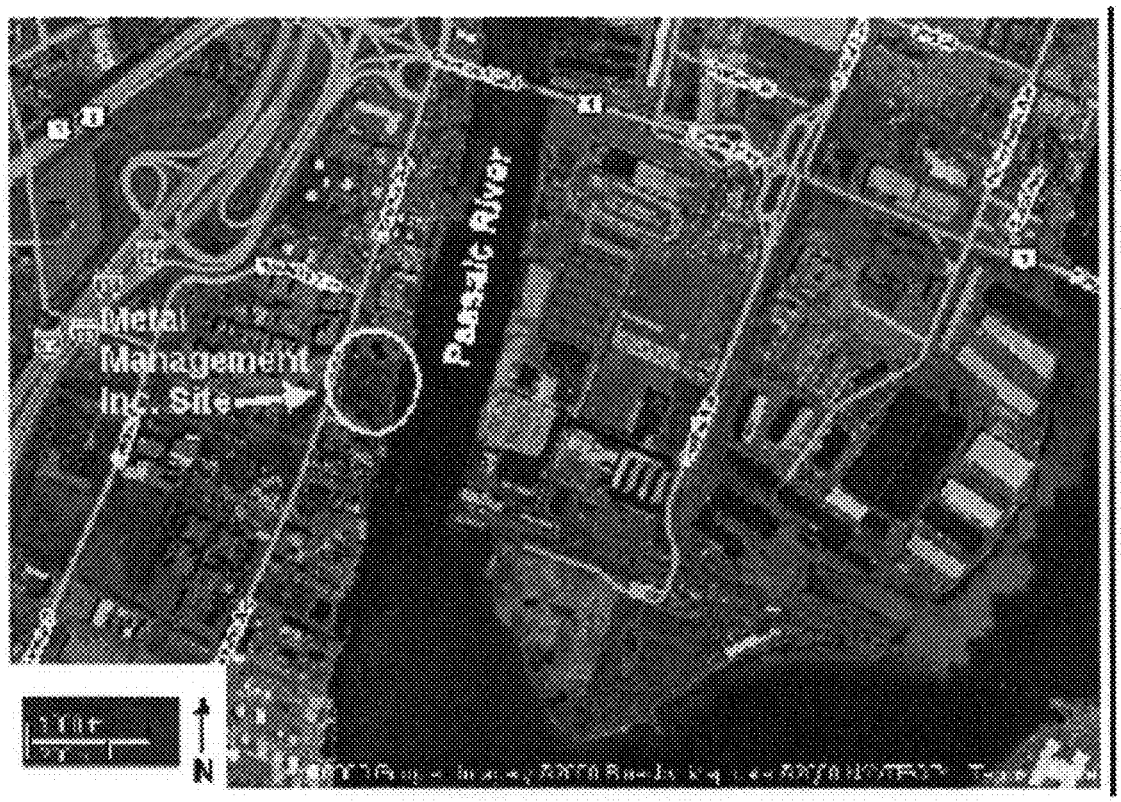
FIG. 1 is an aerial photograph showing the Metal Management, Inc. site on the West bank of the Passaic River. The site's waterway sediments are known to be heavily contaminated with dioxins and other contaminants.

Overview of the Invention.

The existence of chemical contamination in the environment is well documented. Hazardous and toxic compounds from both industrial or agricultural activities have found their way into landfills, waterway sediments and water columns, cultivated lands, and other environments over the course of time through purposeful disposal or accidental discharge. Recent acknowledgement of the health and environmental risks of such contamination has led to a search for solutions which are both technically and economically feasible.

Remediation and bioremediation of soils, sediments and water bodies contaminated with hazardous waste are serious environmental challenges facing society today. For example, industrial facilities for the manufacture of fuel from coal and crude oil are linked to the contamination of soils with polycyclic aromatic hydrocarbons (PAHs) which have toxic, mutagenic and carcinogenic properties. In another example, the light hydrocarbons used as solvents by the chemical industry for decades have become deposited in soils. Further, wood preserving facilities have contaminated soils with PAHs and creosote. In addition to industrial chemical wastes, soils have also been polluted with pesticides, insecticides, and herbicides, many of which are poorly degradable and persist for many years in the environment. Also, the reuse of abandoned properties leads to the discovery of contaminants separately stored on secure landfills leaking from underground tanks.

While much is known regarding remediation and bioremediation technologies for decontaminating toxic environments, there is a deficiency in the art of large-scale in situ technologies that are capable of detoxification, degradation and mineralization of a range of contaminants including hyper-stable chlorinated compounds, such as dioxins, from substantially large amounts of sediment in a manner that is a manner that is sufficiently inexpensive, effective, and efficient.

The present invention solves these deficiencies and needs of the art by providing a new and improved in situ bioremediation system, methods for constructing such systems, and methods for using such systems, for biodegradation, detoxification and mineralization of toxic organic and inorganic compounds, especially dioxins, in contaminated geologic settings, such as waterways. The present invention further relates to a new and improved in situ bioremediation system that comprises both an anaerobic component and an aerobic component that are coupled to each other and which is enriched with carbon, nutrients and growth factors in sufficient amounts to establish a full spectrum oxidization-reduction gradient thereby enabling, promoting and providing indigenous microbial populations to biodegrade, detoxify, and mineralize toxic organic and inorganic compounds in a contaminated geological site.

Definitions. The following definitions can be referenced to assist in understanding the subject matter of the present application. Additional terms may be found defined throughout the detailed description.

The term "bioremediation" refers to detoxification, mineralization, and degradation of toxic compounds by the activities of microorganisms, including bacteria and fungi. In one sense, the effect of bioremediation is that the concentration of a compound decreases as it is converted into less toxic and innocuous intermediates and end products. For the purposes of the invention, bioremediation can include abiotic processes as such processes may facilitate the biotic processes. It is not necessary to understand the exact biochemical, enzymatic, physiologic, or abiotic processes of the biogeochemical reactor of the invention in order to work the invention.

A "compound" as used herein refers to a molecule that is not typically in the environment, for instance a pollutant or a contaminant. A compound can be toxic to a plant or an animal. Exemplary compounds are dioxins.

"Degradation" of a compound includes, for instance, removing or otherwise changing at least a portion of the compound. Degradation of a toxic compound can result in a compound having increased toxicity relative to the non-degraded compound, a compound having about the same toxicity as the non-degraded compound, or a compound having lower toxicity relative to the non-degraded compound. A degraded compound having lower toxicity to a plant and/or an animal relative to the nondegraded compound is referred to herein as "detoxified." Thus, "detoxification" refers to the degradation of compounds such that the resulting degraded compounds or break-down products are not toxic.

The related term "biotransformation" refers to the conversion of a first compound to a second compound through the action of a microorganism or a bioproduct from the microorganism, such as an extracellular enzyme acting on the first compound, or through components such as electrons or protons resulting from the effect of the microorganisms, etc. The first compound can be associated with toxicity, whereas the second compound can be nontoxic.

"Mineralization" refers to the degradation of a compound completely to carbon dioxide, water, chloride, etc.

The term "microbe" and "microorganism" are used interchangeably herein and refer to a single-cell eukaryotic or prokaryotic organism. A microbe is "isolated" when it has been removed from its natural environment and can be grown as a pure culture. For example, a microbe can include a bacterial or fungal species. The microbes of the present invention include a range of microorganisms that span a range of physiologies such that respiration may occur over a full spectrum oxidation-reduction gradient, including methanogenesis, sulfate reduction, disimilatory metal reduction, nitrate reduction and oxygen reduction (aerobic respiration).

The term "bacteria" refers to any bacterial species including species of eubacteria and archaea.

The expression "indigenous microbial consortia" refers to the naturally-occurring populations of bacteria and other microorganisms that are already present in sediments. Indigenous microbial consortia do not include microorganisms exogenously added to the sediment, such as, for example, genetically enhanced microorganisms, but does include the microorganisms which may develop spontaneously in compost, waste water treatment, etc.

The expression "full spectrum oxidation-reduction gradient" refers to a gradient of electron donor and acceptor molecules and/or metals present in sediments and water columns of the biogeochemical reactor of the invention that can be utilized, either by microbial respiratory processes or abiotically, to assist in the degradation and biotransformation of the dioxins and other contaminants of the invention. Bacteria can degrade compounds by using the compounds as electron acceptors, which can be coupled to electron acceptor compounds (or metals) through the process of respiration (the energy-yielding electron transport chain reactions that generate ATP molecules). The electron acceptor molecules of the present invention can include any suitable acceptor, including, for example, oxygen, nitrate, metals, such as iron, manganese, and zinc, sulphate and carbon dioxide. The "gradient" refers to the process where bacteria begin using less efficient terminal electron acceptor molecules as the more efficient terminal electron acceptors are consumed or made unavailable during the biodegradation process. This process sets up an oxidation-reduction gradient or "geochemical zones" along the contaminant plume or the sediment column and water column of the inventive biogeochemical reactor. The geochemical zones are as a result of bacteria using different terminal electron acceptor processes. Thus, the "full spectrum" aspect of the above expression refers to the presence of a redox gradient ranging from the lowest energy-yielding terminal electron acceptors (e.g. carbon dioxide) to the highest energy-yielding terminal electron acceptors (e.g. oxygen). Whether an electron acceptor is poor or high relates to the energy yield from the transfer of electrons through respiration (or abiotically in some cases) from the electron donor to the electron acceptor. The term "oxidation-reduction gradient" has the same meaning herein as "redox gradient."

The expression "sediment component" refers to the mixture of contaminated sediments with an effective amount of carbon, nutrients and growth factors comprising the biogeochemical reactor of the invention which can be spatially configured, e.g. layers, in a manner to promote the biotic and abiotic degradation, detoxification and mineralization of the contaminants of the invention.

The expression "salt marsh component" refers to the salt marsh cap that is constructed over and coupled to the sediment component. The salt marsh component can include peat, rhizosphere, and salt marsh grass species, such as, *Spartina altemiflora*, mangroves, or in benthic environments, eelgrass beds. The coupling of the salt marsh or plant component and the sediment component establishes a full-spectrum oxidation-reduction gradient.

The term "humic material" refers to substances that are divided into three categories: humin, humic acid, and fulvic acid. Soils contain each of these three substances which are distinguishable from each other based on their solubilities in water. Humin is the fraction that is insoluble in water at all pH values, humic acid is insoluble under acid conditions (pH <2) but soluble at higher pH values, and fulvic acid is soluble at any pH. The structure of humin differs from that of humic acid in several ways. Both humin and humic acid are made up mostly of carbon, oxygen and hydrogen with some nitrogen and inorganic elements. Humin molecules are larger than humic acid, they contain a higher carbon content and a lower oxygen content. Humic acid is basically a smaller, more oxidized material, with typical molecular weight ranging from 10,000-100,000 Da. It is important to note, however, that no sharp divisions exist between humic acids, fulvic acids and humins. They are all part of an extremely heterogeneous supramolecular system and the differences between the subdivisions are due to variations in chemical composition, acidity, degree of hydrophobicity and self-associations of molecules. Humic substances arise by the microbial degradation of biomolecules (lipids, proteins, carbohydrates, lignin) dispersed in the environment after the death of living cells. A large amount of humic molecules are represented by hydrophobic compounds (long alkyl-chain alkanes, alkenes, fatty acids, sterols, terpenoids, and phenyl-alkyl residues of lignin degradation) which allow their self-association into supramolecular structures separated from the water medium and, thus, their long residence time in the environment.

The expressions "bioremediation system" and "biogeochemical reactor" are used herein to refer to the new and improved in situ system of the invention for carrying out the bioremediation of contaminated waterway sediments. The expressions are equivalent for the purposes of this invention.

The expression "geologic site" refers to any environmental site, including a waterway, river, pond, estuary, ocean or bay, and any sediments and/or water components therein.

Contaminated Sediments

The sediments to be treated in accordance with the bioremediation system and methods of the present invention can contain any type of contamination, such as, but not limited to chlorinated hydrocarbons, polyaromatic hydrocarbons (PAHs), alkanes, e.g. natural gasoline, kerosene, gas oils, furnace and diesel oils, and lubricating oils, alkenes, polychlorinated biphenyl's (PCBs), aromatic hydrocarbons, e.g. benzene, toluene, ethylbenzene, xylenes, phenols and cresols, halogenated (e.g. chlorinated) hydrocarbons, e.g. trichloroethylene (TCE), tetrachloroethylene (PCE), 1,1,1-trichloroethane (TCA), heavy metals, e.g. copper, lead, zinc, lead, mercury, cadmium and chromium, acids, e.g. sulfuric acid and nitric acid, salts, e.g. sulfates and nitrates, and dioxins, e.g. 2,3,7,8-TCDD.

Preferably, the sediments contain dioxin contaminants. Dioxins are generated when chemical wastes containing dioxin precursors, such as municipal wastes and medical wastes, are incinerated in incinerators such as refuse furnaces and recycling facilities, e.g. dioxins can be produced as by-products of various chlorination and combustion processes. The substances referred to as dioxins are grouped into dioxin-based compounds (PCDD: polychlorinated dibenzo-p-dioxin), in which two benzene rings containing two replaced chlorine atoms are connected through two oxygen atoms, and furan-based compounds (PCDF: polychlorinated dibenzofuran) which is connected through one oxygen atom. Dioxins include their isomers which include as many as 75 types for dioxin-based compounds and 135 types for furan-based compounds depending on the position and the number of replaced chlorine atoms. In other words, a total of 210 dioxin compounds can be present. Such compounds can sometimes be referred to as "congeners." Among them, 2,3,7,8-TCDD is known as the most toxic substance to the human body and the environment and can remain in the human body and the environment for a long time. Further, since dioxins are highly stable water-insoluble substances and their toxicity is substantially permanent, they are considered to be the most significant chemical substance that causes environmental pollution.

The chemical and physical stability of PCDD and PCDF is a primary reason PCDD and PCDF pose such a significant environmental contamination problem. Because PCDDs and PCDFs do not readily degrade in the environment after disposal or dissemination, and are lipophilic, they are persistent and tend to accumulate in living organisms. PCDDs and PCDFs have been shown to be widespread environmental pollutants, occurring in most human and animal adipose samples, milk, sediment and numerous other matrices. Animal studies with both mixtures and individual congeners of PCDD or PCDF have shown a variety of acute and chronic toxic effects. G. Mason, et al., Toxicology, 41, 21 (1986). At the present time, a dioxin congener, 2,3,7,8-tetrachlorodibenzo-p-dioxin, as mentioned above, is believed to be the most acutely toxic environmental contaminant known. The significance of the PCDDs and PCDFs is currently one of the most studied aspects of environmental toxicology. Anon, Environ. Sci. Technol., 29, 26A-28A (1995). Hence, there is wide interest in improved methods for remediation, mineralization and/or detoxification of dioxins in contaminated sediments.

The present invention contemplates that bioremediation carried out in accordance with the principles of the invention can be used to process or treat a sediment containing any one or more of the above mentioned contaminants and any mixtures thereof. The source of the sediments are not meant to be limited to any one region, location, or geographical site and can include both submerged and nonsubmerged sediments. In other words, the contaminated sediments can be obtained from the bottoms of rivers, ponds, lakes, oceans, estuaries, bays, or any waterway or from their land/water interfaces, e.g. a river bank or edge. The contaminated sediments can also be obtained from any land-situated contaminated site, including locations that are proximal to waterways, e.g. the shoreline of a contaminated bay or river or estuary. Moreover, there is no requirement that the sediments to be treated be obtained from a site that is proximal to the bioremediation system of the invention. Any sediment from any geological site or location can be translocated to the inventive biogeochemical reactor by any suitable means, such as, for example, a barge, truck, aircraft, or pipeline. Thus, the present invention is suitable for the treatment of sediments from locations both far and near the bioremediation system of the invention.

Overview of the Degradation Processes of the Invention.

The present invention relates to a new and improved biogeochemical reactor advantageously configured to carry out bioremediation of contaminated sediments. The inventive system contemplates both biological, e.g. microbial processes, and non-biological processes (a/k/a abiotic processes) to carry out the biodegradation, detoxification, and mineralization of the contaminated sediments of the invention. In a broad sense, a bioremediation system for remediating dioxins and other contaminants from a geologic site is provided by the instant invention. The bioremediation system comprises a sediment component coupled to a salt marsh component, and the system is enriched with an effective amount of carbon, nutrients and growth factors to sufficiently establish a full spectrum oxidation-reduction gradient among the indigenous microbial consortia present therein, wherein the consortia is capable of remediating the dioxins and other contaminants in the presence of the full spectrum oxidation-reduction gradient. In other terms, the bioremediation system comprises a sediment component enriched with carbon and nutrients such that highly reducing conditions are established, together with a marsh, eelgrass, and/or oxidized sediment pole of the system to complete the gradient from reduction to oxidation in the biogeochemical reactor.

While not wishing to be bound by theory, the biogeochemical reactor of the present invention is based on the principle that a full spectrum oxidation-reduction gradient is necessary to degrade and/or mineralize the range of contaminants addressed by the present invention, from simple alkanes and alkenes to benzene and polyaromatic hydrocarbons to hyperstable chlorinated compounds, such as dioxin. A fully reduced, electron rich terminus is needed to mineralize dioxins and other chlorinated hydrocarbons, while successively more oxidizing environments are needed to break down or degrade PAHs, ring compounds, alkenes and alkanes. While a metal such as mercury can be mobilized and methylated under certain anaerobic conditions, it is precipitated and sequestered, along with several other heavy metals, under sulfate reducing conditions in depositional environments. In order to mineralize dioxins, eliminate other hydrocarbon and metal contaminants, and create a long term sink for nitrogen, BOD, and other contaminants in the water column, it will be necessary to establish systems which connect these gradients as in the present invention, i.e. an inter-tidal salt marsh on the oxidized surface coupled beneath to a sediment layer component comprising microorganisms capable of a range of physiologies over a full spectrum oxidation-reduction gradient, including methanogenesis, sulfate reduction, dissimilatory metal reduction, nitrate reduction and aerobic respiration. Accordingly, the present invention relates in one aspect to an in situ bioremediation program comprising a coupled sediment/salt marsh system capable of mineralizing dioxins in sediments, but also capable of removing contaminating heavy metals, hydrocarbons and other contaminants from the sediments and water column through precipitation and mineralization.

For more than thirty-five years, the behavior of plants, microbial communities and ecosystems have been utilized and investigated to incorporate remediation treatment techniques to protect and improve human and environmental health (Odum 1969). The following sections discuss relevant knowledge pertaining to biomediation processes generally and as they relate to sediment pollutants, such as, dioxins and other chlorinated compounds, and water column pollutants, such as, metals and hydrocarbons that may be useful as a background in understanding the present invention.

Sediment Pollutants

Biogeochemical processes at work mineralizing hydrocarbons in sediments have been documented for two to three decades (Herbes & Schwall 1978; Gambrell & Patrick 1988). The concept behind bioremediation is to utilize naturally occurring organisms (e.g. bacteria, fungi, plants) to clean contaminated soil and water. There are a wide variety of mechanisms by which remediation can be achieved, including oxidation-reduction and electron-proton additions. These mechanisms operate in concert with structures that decrease activation energies, and the whole reaction sequence is constrained by enthalpy/entropy production. While it is expected that specific mechanisms should be operative, it must be appreciated that mechanisms are not always known and well characterized, as is the case with dioxin breakdown and mineralization. Nonetheless, a great deal is known (Hinchee et al. 1995).

Dioxins

Several decades of research have been performed on the characterization and behavior of dioxins and dioxin-like compounds. This research has created increasingly well grounded documentation of dechlorination and mineralization under laboratory as well as field conditions (Wittich et al. 1992; Monna et al. 1993; Beurskens et al. 1995; Barkovskii and Adriaens 1996; Buinge et al. 1997; Ballerstedt et al. 1997; Halden et al. 1999; Häggblom 2000; Vargas et al. 52001; Adrian and Lechner 2004). More than five years ago it was stated in the literature: "Microbially-mediated reductive dechlorination of organohalides is well established, and there is recent evidence for microbial reductive dechlorination of polychlorinated dibenzo-p-dioxins and dibenzofurans (PCDD/Fs) in marine and estuarine environments" (Häggblom 2000). To a substantial degree, members of the consortium of microbes capable of dechlorination and mineralization have been identified (Yoshida et al. 2005). To benefit from this work, field applications are a necessary next step.

This increasing body of evidence supports the potential for in situ bioremediation of dioxins, as has recently been suggested (Kao et al. 2001). However, there has been no documentation of a large-scaled project, built and tested to address negative impacts on environmental quality and human activities by cleaning up contaminated sediments that include dioxins. To best fill this void, this invention specifically relates in one aspect to microbially mediated reductive dechlorination of polychlorinated dibenzo-p-dioxins. An objective of the present invention is to provide a large-scale in situ bioremediation system for targeting dioxin breakdown of contaminated sediments, such as those from the Metal Management Inc. site in the Passaic River.

Dioxin contamination in certain sediments are known to be quite high. For example, sediment concentrations of 2,3,7,8-TCDD (cited as the most toxic of the dioxin congeners) in tidal estuaries of the Passaic River are on the order of 0.11 to 6.9 ug/kg (or 0.3 to 21.5 nmol/kg) (Bopp et al. 1991).

Dechlorination mechanisms, which remove chlorine from dioxin ring compounds, together with biochemical pathways and kinetics, have been studied under controlled laboratory conditions for more than 20 years. Early research by Townsend (1983) and Beurskens et al. (1993) indicate that biological dehalogenation processes could occur in anaerobic sediments. Subsequently, a specific group of soil bacteria, *Dehalococcoides*, has been identified as the specific taxa involved in dechlorinating dioxin compounds (Bunge et al. 2003). In certain aspects, such microorganisms can function as an important initial step of the bioremediation system of the invention. However, any suitable microbe capable of dechlorinating dioxins is within the ambit of the invention and the invention is not limited to *Dehalococcoides*. Other microbes that may dechlorinate dioxins include, for example, members of the phyla Firmicutes, Proteobacteria, and Bacteroidetes (Yoshida et al. 2005), and the fungi *Phanerochaete sordida* (Takada et al. 1996), amongst other putative dechlorinators. The following discussion will focus the rates at which these microbes can work to dechlorinate dioxins and the environmental conditions that sustain their growth.

The first thoroughly documented evidence that dechlorination of dioxins can be microbially mediated comes from the work of Adriaens et al. (1995). Highly chlorinated PCDDs were studied in long-term anaerobic microcosms using Hudson River sediment and contaminated aquifer material in Pensacola, Fla. In efforts to discern microbial contributions to dioxin transformation, a subset of microcosms were autoclaved to destroy any microbes that may be present in the soils. Monitored PCDD concentrations in these microcosms were compared with those present in microbially active sediments. Autoclaved sediments showed much less dioxin transformation than biotically active microcosms, supporting the hypothesis that microbes in the sediment contribute to reductive dechlorination. Some dioxin transformation in the autoclaved sediments was observed, and these reductions were attributed to abiotic mechanisms, discussed below. Based on the removal rates observed in the active microcosms over a two-year period, the half-life of dioxins was determined to be 1.0 to 4.1 years. The author noted that actual half-lives in the environment could be much longer, however, because the rates of transformation are limited by the rates of desorption and the solute concentration of the PCDD. To minimize partitioning and sorption/desorption limitations, it was noted that further investigations "using sediment-derived suspended cultures in a system where the desorption of substrates with log $K_d>6$ can be successfully promoted and/or by facilitating electron transfer" should be carried out (Adriaens et al. 1995).

Methanogenic systems should fulfill some of these requirements in that they are both electron rich, and high in a number of organic acids, which can act as surfactants, partitioning less soluble compounds into solution.

In 1996, Barkovskii and Adriaens evaluated the ability of a microbial consortium obtained from the Passaic River to dechlorinate PCDDs. They found that both aged and freshly spiked octa- and hepta-CDDs were reductively dechlorinated to yield hexa-, tetra-, tri-, and mono-CDD congeners. Two primary pathways were postulated, and are shown in FIG. 4.

An interesting observation during this experiment was that methanogenic activity and methane production ceased partway through the seven month experiment. Dechlorination however, persisted, indicating that the presence of anaerobic, non-methanogenic microorganisms were responsible for the dechlorination of hepta- to penta-CDD and tri-CDD isomers and further dechlorination of the tri-CDD congener group to mono-CDD. Up to 26% of the initial octa-CDD was converted to lesser chlorinated compounds after 7 months.

Figure 4:
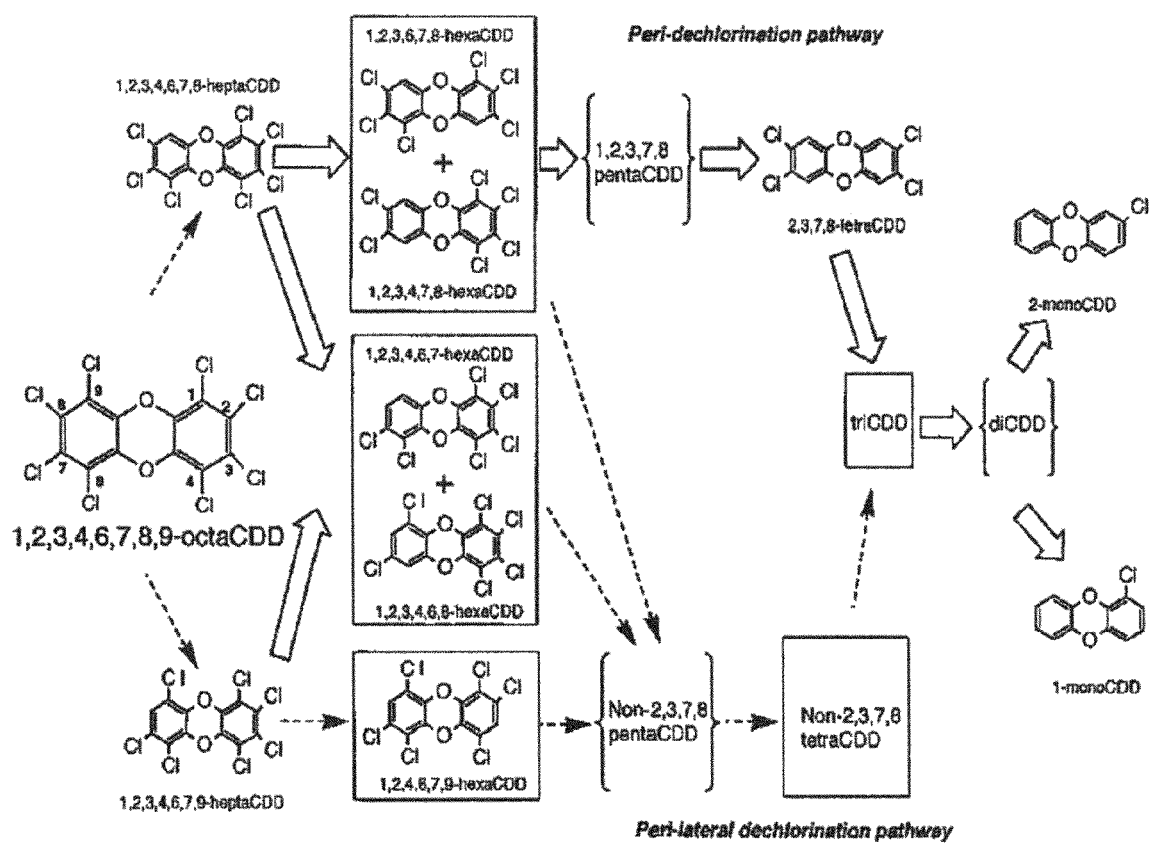
FIG. 4 depicts the pathway of PCDD (dioxin) microbial dechlorination as hypothesized in the prior art. The broad open arrows represent activity of nonmethanogenic, non-spore-forming microorganisms.

FIG. 4 presents a multiple, branched dechlorination pathway. Specific mechanisms were not determined however, because methanogenic behavior ceased during the experiment while dechlorination continued. It was inferred that methanogenisis is not essential to these dechlorination pathways.

In another study, Ballerstedt et al. (1997) investigated reductive dechlorination of 1,2,3,4-TCDD in sediments obtained from the Saale River. Evidence of dechlorinating bacteria in the river sediments was found. After 388 days 37 mol % of the TCDD was reduced to DiCDD. The highest rates of up to 0.06 µm/day were observed between days 50-250. The authors emphasize the suitability of river sediments as a source of PCDD-dechlorinating anaerobic bacteria.

In yet another study, Adriaens et al. (1996) investigated the breakdown of octaCDD by both abiotic and biotic mechanisms. They determined that abiotically mediated dechlorination reactions may be a significant contributor to the fate of penetachlorinated dibenzo-p-dioxins (PCDDs) and polychlorinated dibenzofurans (PCDFs). They proposed that, "Functional groups from plant debris and other organic matter (e.g. phenols and quinines), heavy metals (e.g. Zn, Cr . . . ), biogenic factors (e.g. vitamin B12), and reduced mineral surfaces (e.g. ferric monosulfides, . . . ) constitute potentially significant electron shuttles in anaerobic environments." (Adriaens et al. 1996)

Thus, Adriaens et al. (1996) showed the postulated abiotic processes that contribute to dechlorination (see FIG. 1 of Adriaens). Note that compounds and metals involved are well-known electron shuttles in a number of environments, acting also within the intracellular biochemical matrices, and include electron shuttles such as zero valence metals (e.g. zinc), hydroquinone/quinone pairs, and vitamin $B^{12(reduced)}$/vitamin $B^{12(oxidized)}$. Since both quinones and $B_{12}$ are biotically produced, interactions may exist between biotic and abiotic chemical kinetics, mediated by the production of specific electron shuttles.

The objective of the work of Adriaens et al. was to evaluate and quantify the potential for the abiotic activity mentioned above in terms of contributions to dechlorination. They postulated that:

"The quinone/hydroquinone couple is the electron transfer mediator. With quinones and phenolic groups ranging from 13 to 56% of all oxygen functional groups in natural organic matter (Schnitzer and Khan 1972), organic-mediated dechlorination reactions may potentially contribute significantly to the fate of chlorinated contaminants in general, and that of PCDD/F in particular." (Adriaens et al. 1996)

This provides an especially intriguing description of how zero valence metals, quinone-hydroxyquinone, as well as $B_{12}$ or Cobalamin mediated reactions, may situate themselves or self-organize in an electron transfer gradient and, in the process, contribute to dechlorination. The presence of a carbon source allows for the removal of oxygen and establishment of a redox gradient, into which the flow of electrons is structured. While the nature of the molecular matrix that facilitates this electron flow is still not known in detail, such a detailed understanding is not necessary to operate the present invention. The participation of metal oxidation-reduction in the bioremediation of chlorinated compounds, however, has been well documented (Petrovskis 1995; Petrovskis et al. 1995).

A direct implication of the above work with respect to the present invention is that in contaminated sediments enriched with organic matter, nutrients (e.g. vitamins and quinone-hydroxyquinone), specific metals will facilitate dioxin dechlorination. Specifically, organics rich in quinones, phenolics and other oxygen containing or otherwise potentially reactive physical-chemical surfaces may cause or increase the probability of dioxin dechlorination/mineralization. The demonstrated activity of abiotic and biotic mechanisms indicates that conditions exist which significantly increase the probability of chlorine removal/substitution on dioxin rings.

Another study (Fu et al. (1999), contributes to and supports the hypothesis that abiotic conditions contribute directly to dioxin dechlorination. They observed 1,2,3,4,6,7,9-heptaCDD dechlorination rates of up to 20% after 3 months due to the presence of humic substances alone, with their results indicating that the electron shuttling capacity of sediment dissolved organic carbon (DOC) may significantly affect the fate of dioxins, in part through dechlorination reactions (Fu et al. 1999).

Albrecht et al. 1999, in another report, noted that:

"the stimulation of per-dechlorination without accumulation of 2,3,7,8-TeCDD and further lateral dechlorination to 2-MCDD in the presence of hydrogen gas presents a promising approach for the development of enhanced remediation strategies for dioxin contaminated sediments."

This evidence for hydrogen gas stimulation of dioxin dechlorination provides another documented approach with which to structure a remediation strategy incorporating by-products of biogeochemical activities. Hydrogen gas increases in concentration during the development of methanogenic conditions. Hydrogen gas is a product of specific metabolic pathways which, as methanogenesis develops, provides $H_2$ as an input to the consortium of microbes that produce methane itself. This compound then leaves the sediment column as a gas, removing four hydrogen atoms per carbon atom, thereby acting to regulate hydrogen concentration and pH. Thus the Albrecht et al. 1999 finding, on hydrogen participation in dechlorination, together with the results of Fu et al. (1999) and Adriaens et al. 1996 on electron shuttles, supports that hypothesis that both proton and electron fluxes are involved in dechlorination reactions. Albrecht et al. also found that Bromodioxin-amended samples showed higher rates of dioxin degradation.

Vargas et al. (2001), following the work of Ballerstedt et al. (1997) described above, studied the biotransformation of 1,2,3,4-TCDD under various anaerobic redox states. The study was performed using contaminated sediments from the Arthur Kill in the NY/NJ Harbor Estuary. After seventeen months under methanogenic conditions and amended with three different monobromophenol isomers, they found that 80% of the 1,2,3,4,-TCDD in the contaminated sediments was reduced to primarily 1,3-diCDD, with some 1,2,4-triCDD. Kao et al. (2001) found similar breakdown rates to those of Vargas et al. (2001). Kao et al. found that, under methanogenic conditions, 86% of 2,3,7,8-TCDD was reduced to lesser chlorinated compounds in microcosms containing activated sludge and sludge cake as carbon sources, beginning with an initial concentration of 96 ug/kg (ppb). According to these studies, complex carbon sources, chemical analogues, and electron rich environments contribute to order of magnitude or greater dioxin concentration reductions.

Figure 5:
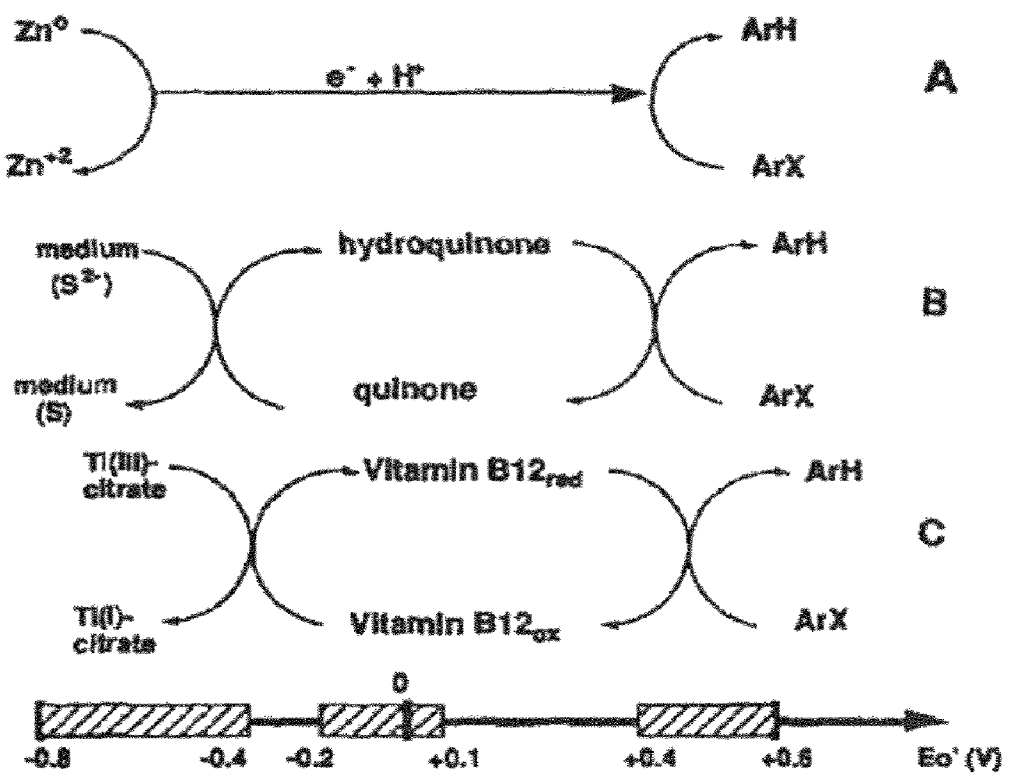
FIG. 5 depicts electron flow between electron donors and inorganic (A), organic (B) and biogenic (C) electron transfer molecules and highly oxidized compounds as hypothesized in the prior art.

Fu et al. (2005) compared the yields of less chlorinated congeners from HpCDD under anaerobic conditions in the presence of an active microbial community and either sulfate and/or 2-bromodibenzo-p-dioxin (2-BrDD) as a primer. They found the highest rates and amounts of dechlorination in samples that did not contain sulfate and had been primed with 2-BrDD. More than 65% of the less chlorinated congeners existed as di- and mono-CDD after 12 months under these conditions. On inspection of the data presented in Fu et al. (2005), the inventor has observed that sulfate apparently acts to inhibit the production of dechlorinated by-products, while priming the systems with a bromonated analogue increases dechlorination. See FIG. 5 of Fu et al. (2005). This data suggests that sulfate reduction to sulfide is a necessary corollary of the removal of chlorine groups from dioxins. This implies that a biogeochemical reactor designed to mineralize dioxins should span a range of redox states, at least from sulfate reduction to methanogenic. One aspect of the present invention provides a bioremediation system comprising a sediment component column that couples methanogenesis with sulfate reduction.

This theory finds further support in that, in the course of evaluating the differential modification of dioxins, Fu et al. (2005) found increased quantities of daughter compounds were produced under conditions with 2-BrDD compared to the addition of sulfate (see FIG. 6 of Fu et al. (2005)). The study shows that the initial concentration of HpCDD was 410 nM. Approximately 72 nM (17%) of lesser chlorinated products were formed, and roughly 46.8 nM (11%) existed as di- and monoCDD congeners. Because increasing chlorination confers greater stability on dioxin-like molecules, this finding indicates decreasing stability and increasing potential for mineralization/degradation for this class of chlorinated hydrocarbons in these microcosms, and also in sediment columns where similar reactions can be induced to occur.

Other Chlorinated Compounds

Holliger et al. discussed chlorinated compounds in general, dechlorination, and dehalorespiration, and the immense variety of microbial consortia involved in the breakdown and processing of these compounds.

"In the past decades, the chemical industry has developed a large variety of different chlorinated compounds to be used as intermediates for chemical synthesis, as cooling agents, solvents, pesticides, and many other applications. These chlorinated compounds can be reductively dechlorinated by anaerobic bacteria. The diversity of reductively dechlorinating bacteria is large, almost equaling the diversity of chlorinated compounds synthesized. However, many new genera and species of dechlorinating bacteria remain undiscovered. The dechlorinating organisms known at present belong, phylogenetically, to different groups of bacteria and range in their physiology from facultative anaerobes, nitrate, iron, and sulfoxy anion reducers, fermentative bacteria, and methanogens to strict reducers of chlorinated compounds . . . . The recent advances in investigating dissimilatory dehalogenation reactions have opened up a field that is of great interest and importance for fundamental as well as applied research. The big challenge now is to transfer the knowledge gained on the bacteria and biochemistry involved to applied situations, in order to realize the goal of being able to remediate polluted sites." (Holliger et al. 1999)

These authors expressly state that the immediate challenge facing progress does not lie in further extension of laboratory-scale projects, but rather in the application of what has been gleaned from these studies to larger scale in-situ field studies such as the present invention. Moreover, the redox gradient of dechlorinating organisms of the present invention extends across a range of redox states from strict aerobes to facultative aerobes to nitrate, iron, sulfate reducers to methanogens, i.e., across the spectrum of physiological capacities, from aerobic respiration to partial use of oxygen as a terminal electron acceptor to carbon dioxide reduction in methanogenic systems. And, it is the inventor's belief that the present inventive remediation system is the first in situ system that provides for a full spectrum redox gradient comprising a sediment component and a salt marsh cap. This use of a reducing sediment pole and oxidizing cap vegetated with saltmarsh, algae, eelgrass, or other submerged aquatic or surface wetland vegetation offers multiple ecological opportunities to integrate into in-situ dioxin and hydrocarbon remediation with dredging and ecological restoration.

More recently, Yoshida et al. (2005) makes this point by stating:

"As reported here, a PCDD/F-dechlorinating microcosm that exhibited an apparent half-reduction rate of 14 months was successfully constructed. One of the most striking observations in this microcosm is that PCDD/Fs were totally dechlorinated without the accumulation of significant amounts of 1-3CDD/Fs as the intermediate or end products. Thus, the complete dechlorination of PCDD/Fs seemingly took place in the microcosm." (p4331, Yoshida et al. 2005).

In one aspect, the present invention aims to establish a full spectrum redox range through the use of carbon and nutrient sources, including sludge cake, compost with high phenolic content, molasses or other carbon sources, as well as zero valance metals, such as, zinc or iron, which can function as electron donors. Through these steps, the present invention in one aspect aims to create and enhance the structural complexity of a sediment column to establish oxidation-reduction gradients within a biogeochemical reactor of the invention capable of fully processing dioxins and their breakdown products. By enriching lower portions of the sediment column with nutrients and a carbon source along with heterogeneous surfaces which may contribute to electron or proton transport, and by capping the upper portions of with compost, rhizosphere and salt marsh, this invention specifically establishes the conditions necessary for dioxin remediation.

Water Column Pollutants

The universal solvent in the biosphere is water. This medium is responsible for moving the majority of nutrients as well as pollutants in and around the earth's continents. Metals and hydrocarbons, in solution or associated with particles, are moved in this manner. An important but much lesser fraction of chemicals of concern are moved as dust, colloidal complexes, or otherwise transported by the atmosphere.

Metal solubilities in water are controlled by pH, Eh, specific ion concentrations, and the presence of chelating agents in the water column and sediment pore water. Under high pH, or basic conditions, many trace metals, including copper, zinc, and nickel, are insoluble, and remain adsorbed to base surfaces such as those containing hydroxides, calcium, magnesium, and other kindred materials. Under acidic conditions, however, these metals are much more soluble and mobile (Drever 1982). Metal solubilities in the water column in estuaries generally, and the Passaic specifically, depend on the intrusion and influence of seawater. The latter is highly buffered, limiting solubilities of a number of metals.

Wetland systems can produce between about 800 and 6,000 grams of biomass per square meter per year (Whittaker and Likens 1975). As plants die and decay, a significant proportion of the biomass is turned into humic material. The different fractions of humus have varying capacities to mobilize specific metals. Alternatively, humic materials with high affinities for metals or hydrocarbons precipitate, absorb, or otherwise remove potentially toxic metals from the water column, diminishing the likelihood of contact with the biota. Overall, the net transaction is removal, given the immense and complicated surface area of humic matter (see Frimmel and Christman citation below).

Humic matter in its different forms can act as a relatively weak to a rather strong acid, with a pH range from near 7.0 (neutrality) and extending down to a pH below 2 in bogs, which is similar in acidity to the environment within the stomach. As noted, specific acids derived from humus are capable of mobilizing metals, while others, especially larger and less soluble humic substances, can hold metals and sequester them in sediments. A strategy for partitioning these processes to optimize metal uptake will utilize humic matter from suitable sources, such as, for example, sludge cake and compost, to enhance metal uptake and sequestration, as well as other reactions, keeping metals and other chemicals from reaching the water column.

At the same time, the salt marsh on the surface of this biogeochemical system has been shown to be a major sink for nitrogen, a major water column pollutant in the Passaic River estuary, as well as hydrocarbons, and other carbon compounds (DeLaune et al. 1980; Atlas 1981).

Heavy Metals

Biogeochemical cycles are characterized by rich, oftentimes complicated sets of interactions. For metals, there are groups of biogeochemical processes which remove them from aqueous phase, and other processes and complexes which act to solubilize elements to form a colloidal-phase material which makes these elements more soluble. A classic paper (Weber 1988) on humic materials describes one such interaction as follows:

"At pH 7, in the presence of fulvic acid (a humic product of wetlands), soluble copper will be in the forms of $Cu^{++}$, $Cu(OH)^+$, and FA complexes. Soluble sulfide will be predominantly $H_2S$ and HS—. The binding of $Cu^{++}$ to hydroxide ion and fulvic acid, and the sulfide ion to protons, will increase the concentration of soluble copper."

This paper states, in other words, that at neutral pH, the copper and one common class of humic material, fulvic acids, act to inhibit the binding of sulfide to copper, and thus substantially enhancing the movement of copper into solution. It is however, possible to address such interactions in wetland design by separating, as far as practical, humic materials from active sulfate reducing systems. This approach can also allow sulfate reducing bacteria to metabolize BOD (Biochemical Oxygen Demand) and simple carbon compounds in the process of turning sulfate into sulfide, which, under more basic conditions, binds directly with Cu, Zn, and Ni to produce insoluble metal-sulfide complexes. In-situ treatment design thus specifies spatial separation of humic materials near neutrality from higher pH anaerobic sectors rich in sulfate. This can be done in a sediment column and marsh system by any suitable means, for example, by creating layers or strata, and by only partially mixing the material added during marsh creation.

Another unfavorable biogeochemical interaction occurs where high pH media are coupled with wetlands that produce humic matter. Here, a common inhibitor of the sequestering of copper, zinc, and nickel by humic matter is another prevalent divalent cation. The positively charged calcium ion occupies the same sites on humic molecules as do the metals in question, which can leave the metals in solution. In this project, sulfate biogeochemistry is likely to control metal availability, as described below.

In one aspect, gypsum, a soft mineral composed of calcium sulfate dihydrate ($CaSO_4 2H_2O$) which is commonly used in various building materials (e.g. gypsum wall board, plaster of Paris), can be used as the source of the electron acceptor of the present invention. Without being bound by theory, it is believed that the calcium ion will not interfere with sulfate reduction or sulfide binding. Further, gypsum in certain forms, e.g. discarded gypsum wall board, can be used to layer and/or partition the bioreactor as described herein. Other electron acceptor-containing mining and manufacturing waste-products and/or by-products can be used to construct the bioreactor of the invention, in particular to provide electron acceptors, e.g. sulfate, to facilitate the formation of a full-spectrum oxidation-reduction biogeochemical reactor.

Designing for Sulfide-Metal Binding in Wetland Systems

The sulfur cycle involves a step that facilitates heavy metal removal: in the presence of carbon acting as an energy source, sulfate behaves as a terminal electron acceptor, resulting in sulfide production. This reaction is the basis of a one for one, mole for mole, capacity of sulfide to bind lead, cadmium, mercury, copper, zinc, nickel, and other bivalent metals. This process has been shown to remove heavy metals from solution (Watson et al. 1995). While chemical reactions generally are reversible under specific sets of conditions, and all such reactions are governed by equilibria, the production of metal sulfide complexes tends to be be largely irreversible where pH changes follow deposition (Ito et al. 2002).

Initial metal concentration, pH, and the quantity of reactant were found to control metal availability, with pH playing the predominant role (p 70, Jong & Parry). In this process, a carbon or energy source is essential, measured in BOD/metabolizable carbon. Sulfate source concentration controls sulfide production in reducing environments, but as stated in the literature (Jong and Parry 2004; Watson et al. 1995), the presence of iron may provide other mechanisms by which metals become sequestered and bound in sulfide complexes.

Sulphate reducing bacteria only thrive under anoxic conditions, since oxygen has a higher electron affinity than sulfate, and inhibits sulfate reduction. The sediment column processes that facilitate sulphate reduction involve the establishment of gradients within the sediment column. Available BOD/metabolizable carbon provides an energy source to microbes on the sediment surface, serving as feedstock for aerobic bacteria which then remove oxygen from the system, setting the stage for the development of the sediment column redox gradient, and establishing conditions for nitrate reduction, and below that, the sulfate reducing consortia. In this way, available organic matter regulates the system, establishing the emergent properties dependant on the biogeochemical interactions that can establish steep oxidation/reduction gradients.

Microbial films can develop within and establish this gradient, the surface of which is occupied by bacteria that can use, and/or tolerate, the presence of free oxygen. Beneath these organisms, towards the more electron rich portion of the gradient, sulfate reducers develop. Only here is free sulfide produced. In such an environment, Ito et al. (2002) measured sulfide production rates as $1.3 \times 10^{-16}$ mol of $H_2S$ (g of VSS)$^{-1}$ (h)$^{-1}$ via a sulfate reducing bacteria density of $3.0 \times 10^{10}$ cells (g of VSS)$^{-1}$. This rate of sulfide production can be used as one means for determining the available sulfide for metal complexing, and thus estimating metal removal potential with a microbial film of sulfate reducers of a given dimension.

Watson et al. (1995) found that a reactive material composed of iron sulfide, produced by *Desulfovibrio* in the presence of organic carbon with excess iron, had the ability to bind 138.6 mg/g (dry) and 377 mg/g (dry) of copper and nickel respectively. The pH of these laboratory solutions was adjusted to 7.0 in these experiments. Neutral (7.0), and higher pH, is favorable for the partitioning of a suite of metals into the iron sulfide complex, enhancing and increasing the ability of these systems to sequester metals.

The kinetics and removal rates of metal-sulfide adsorption were investigated by Jong and Parry (2004). A rapid initial uptake of metal ions (Pb, Cu, Cd, Zn, Ni, Fe, As) was observed during the first 24 hours of the experiment, utilizing the most readily available adsorption sites on the adsorbent substrate. Metal adsorption over the next 96 hours was almost negligible. The authors suggested that equilibrium was achieved after a 24 hour period, indicated in the figure below.

The data indicate high initial uptake rates. Note the steep rise on the left side of the graph. As the figure above shows, more than half of the metal binding occurred in the first 2 to 6 hours of contact, indicating a high partition coefficient for metals into sulfide complexes.

Removal rates for copper, nickel, and zinc were as follows: Cu(II)=97.47%, Ni(II)=89.95%, Zn(II)=93.33% after 24 hours. It was determined that pH was the most important parameter controlling adsorption, with highest removal quantities occurring above pH 6.0.

Humic-metal Binding in Constructed Wetlands

Humic matter is found in virtually all naturally occurring waters. In wetlands specifically, between 70-90% of the total dissolved organic carbon is comprised of humic substances (Aiken et al. 1985). The structural makeup and functional groups of many humic substances still remain a topic of investigation. However, these organic compounds have been studied for more than fifty years and much has been discovered about their roles in the environment (Frimmel and Christman, 1988). The main functional group in humus is COOH, with other groups such as phenols, alcohols, enolic-OH, and C=O, comprising a part of their structural makeup (Aiken et al. 1985). Carboxylic acid and other groups are involved in metal binding and mobilization (Weber 1988). Humic substances have a very large surface area, 2000 $m^2$/g (Frimmel and Christman, 1988), and it is this surface area and associated charges sites that provides humic matter with the ability to bind heavy metals by different mechanisms than that of sulfide binding.

In a field study, it has been estimated that 1.0 kg of dry peat can remove 10,000 mg (10,000 µg/g) of nickel from solution (Moshiri 1993), or 1 gram of metal is picked up by about 100 grams of peat, or 10 mg/g. Other experiments, performed in the lab, have determined more conservative sequestering abilities (Bryan et al. 2002; Rashid 1985). These authors determined binding capacities in the range of <1.0 to 15.5 µg/g for copper and zinc, —three orders of magnitude lower. This large discrepancy of values may be attributed to multiple mechanisms at work in the field experiment, as opposed to the controlled laboratory conditions in which the investigators isolated the one particular mechanism of humic-metal complexing.

As in the case of sulfide binding, humic substances also have a greater affinity for heavy metal ions around neutral pH. This is because concentrations of the smallest of positively charged elements, $H^+$, is in solution at higher concentrations at low pH, displacing metals from binding sites on the charged surfaces of the humic material. Also, as noted above, at higher pH, $Ca^{2+}$ competes for binding sites where concentrations of this ion are present (Cao et al. 1995). Because sea water is relatively high in calcium ions, estuarine peats may not have a large role in removing metals from the water column. Materials mixed with sediment, however, including saw dust, composted wood chips, and biosolids-sludgecake, may provide large humic surface area where metals in sediments can be sequestered.

Due to the high degree of complexity involved in characterizing humic matter, the nature and activity of metal binding sites on humic material is not fully understood at molecular scale. It is widely known, however, that the molecular weight of humic matter governs its ability go bind metals. Itabashi et al. (2004) noted that only humic matter of relatively low molecular weight had a significant ability to complex with heavy metals. The high levels of metals in coal and peat together with the well characterized uptake rates of wetlands for metal removal provides an indication of multiple mechanisms involving humus in metal capture in wetland environments, even though precise rates and mechanisms are not well described.

Hydrocarbons

Hazardous materials introduced into sites such as the Passaic River are an ongoing problem. The ecologically engineered habitat restoration proposed in accordance with this invention incorporates a number of potential biogeochemical sinks for these pollutants. While some specific strains of microbes have been added to soils from lab cultures, the beneficial microbes of the present invention are already present in the medium and only require the correct oxygen, moisture, and nutrient concentrations for the growth and development required to achieve significant hydrocarbon breakdown rates. This is demonstrated by the fact that specific microbial communities have been observed to break down hydrocarbons in soils (Dragun 1988; Cerniglia 1992; Baker and Herson 1994; Cookson 1995; Fiorenza 2000). More than fifty different microbially mediated biochemical transformation and cleavage reactions of hydrocarbons in soils have been identified in categories including methylation, ether formation, N-acylation, nitration, nitrosation, and dimerization (Dragun 1988; Lee & Banks 1993). It is likely that most of these reactions also occur in sediments, and especially in the dynamic, heterogeneous rhizosphere environments afforded by salt marsh development. The aim of sediment enrichment is to replicate aspects of such heterogeneity in the sediment column of the inventive reactor.

Cookson (1995) addresses the basics, and describes hydrocarbon bioremediation potentials and mechanisms as follows:

"Hydrocarbons are compounds that contain both carbon and hydrogen. Aliphatic hydrocarbons include: alkanes, alkynes, alcohols, aldehydes, ketones, acids, and cyclic analogs. Aromatic hydrocarbons: benzene, ethylbenzene, toluene, xylene, trimethylbenzene, and other benzene forms make up over 40% of gasoline's composition."

Aliphatic hydrocarbons are straight or branched-chain hydrocarbons of differing lengths. Alkanes shorter than 10 carbons are readily volatilized. Longer-chain aliphatic hydrocarbons are readily degraded under aerobic conditions. In order for microbial systems to perform biodegradation of these compounds, the soil water pH must be kept below 8.5 and other environmental factors must be controlled, as discussed below. Oxygen is the rate-limiting factor for aerobic metabolism of aliphatic (alkane and alkene) compounds. Oxygen is incorporated in the hydrocarbon by oxygenase enzymes oxidizing the compound to an alcohol, then to the corresponding fatty acid through the removal of two carbon units (termed a "beta oxidation sequence"). Several species of *Pseudomonas* bacteria are responsible for mediating these reactions and are commonly found in soils (Cookson 1995).

Aromatic hydrocarbons consist of rings mainly consisting of 6 carbon atoms, represented by double bonds between alternate carbon atoms): benzene, toluene, ethylbenzene, and xylene (BTEX), gasoline components, are typically found in contaminated soils from petroleum spills. Single-ring compounds are readily broken down under aerobic and anaerobic conditions by *Pseudomonas putida* and members of the *Nocardia* genus, which are prevalent in soils.

Several benzene rings join together to form polynuclear aromatic hydrocarbons (PAH). Multi-ring compounds of 2 and 3 rings are readily degraded by soil bacteria and fungi under both aerobic and anaerobic conditions (Cerniglia 1992). Compounds with four or more rings are more recalcitrant due to their low solubility (Cookson 1995).

Wilson and Jones (1993) addressed in-situ breakdown, to carbon dioxide and water, of these higher-ringed compounds. They determined a process by which it is necessary for soil microorganisms to utilize two carbon sources (co-metabolism) in order to break down PAHs of four or more rings. Bacteria that use four-ring PAHs as their sole carbon source are: *Rhodococus* sp. (pyrene and chrysene), *Pseudomonas paucimobilis* (fluoranthene) and *Alicalienes denitrificans* (fluoranthene). White rot fungus, *Phanerochaete chrysosporium*, also has the ability to degrade PAHs greater than three rings (Kostner et al. 1994).

Bioremediation with soil microbes has been a successful method for removing hydrocarbons from soils, and can be enhanced by using plants that act to enrich the rhizosphere environment. Phytoremediation techniques have been developed to aid contaminant mineralization or direct uptake into plant tissue. Approaches that enhance metal uptake by plants have been developed to provide a cost effective alternative to traditional excavation and landfilling operations. While metals have been removed from marsh systems by Spartina and its cobionts (Giblin et al. 1983), the aim of this project is to use this keystone species to provide steep gradients in the rhizosphere to enhance hydrocarbon mineralization, nitrification of ammonia, denitrification of nitrate and sulfate reduction.

Remediation and hydrocarbon removal are likely to take multiple pathways, given the gradients and suite of terminal electron acceptors noted above. Within this matrix, a heterogeneous group of substrates will be mixed into the sediment column. The aim here is to exploit the variety of catalytic capacities offered by humic matter both within the rhizosphere, and at depth, mixed into the dredged material. The multiple chemical groups noted by Aiken et al. (1995) including COOH, phenols, alcohols, enolic-OH, and C=O, as well as spatially contiguous hydrophobic and hydrophilic segments, make humus a potential scaffold on which catalytic activity, structural modifications and/or mineralization of complex hydrocarbons may occur. The ring compounds, hydrophobic, and hydrophilic segments of humic matter may provide surfaces on which ring compounds including PAH's, PCB's and dioxins may be oriented to enhance dechlorination and subsequent ring opening of these otherwise hyperstable compounds.

Excess Nitrogen

The low pore water dissolved oxygen levels found in saturated marsh sediments provides an environment suitable for denitrification, the microbial transformation of dissolved nitrate to nitrogen gas that is then released to the atmosphere. This important biogeochemical function of salt marsh environments can remove about 40 lbs of N/acre/year (Valiela and Teal 1979a & b); White & Howe 1994). The ecological restoration of marsh communities achieved by the invention at sites such as the Metal Management Inc. site in New Jersey is likely to establish bio-engineered nitrification-denitrification systems on the shores of the treated contaminated waterways, such as, the Passaic River, providing essential and on-going nitrogen removal mechanisms to enhance water quality. In general, nitrogen removal depends on marsh area, and the present invention provides an opportunity to increase the scale of restored marsh area at treated waterway sites, such as the Passaic River, from zero acres of intertidal marsh coverage to about one to three acres or more.

The addition of a specific symbiote of marsh grass, the ribbed mussel, can substantially enhance marsh function (Bertness 1984) as well as nitrogen removal (Valiela and Teal 1979a & b. The filtration capacity of mussels is large, and filter-feeding activity can lead to the removal of about 200 lbs. of particulate nitrogen per acre each year.

Retrieval, Transport and Storage of the Contaminated Sediments

The present invention contemplates any known method for obtaining the contaminated sediments that become integrated into the bioremediation reactor of the invention. For the purpose of the present invention, any suitable process or means known to one of ordinary skill in the art used to obtain and move contaminated sediments of the invention into the bioremediation reactor are contemplated and can be referred to as "sediment translocation." Preferably, any method or device utilized for sediment translocation should minimize inadvertent release, spread, or dissemination of sediments or the contaminants therein arising from the translocation process itself.

It will be appreciated by those of ordinary skill in the art that removal of sediments that accumulate at the bottoms of natural and artificial water body channels is commonly practiced to permit navigation of ships and/or to maintain designated water depths and/or to permit construction of infrastructure, e.g. roadways, bridges, and shipping piers. For the purposes of the present invention, this type of sediment removal can be referred to as "infrastructural" or "navigational dredging." In addition, sediments can be removed from waterway beds for the purpose of removing contamination in the sediment. Hereinafter, this type of dredging will be referred to as "environmental dredging." In some cases, as in the present invention, the objectives of the sediment removal activity are both on infrastructure and environmental needs.

Current methods of infrastructural or environmental dredging can be divided into two general categories, both of which are contemplated by the present invention. They include mechanical dredging and hydraulic/vacuum dredging. The fundamental difference between these categories is the equipment used and ultimately the form in which the sediments are removed. Mechanical dredging typically involves removing the sediments directly with clamshell-type buckets at a relatively low liquid to solid ratio (i.e., relatively little water is entrained in the sediments compared to hydraulic dredging operations). Hydraulic/vacuum dredging agitates the bottom channel to dislodge the sediment, after which the loosened sediment is pumped or vacuumed from the waterway. In hydraulic dredging operations the sediment can be transported in a slurry with water acting as the transportation medium. This can result in a water-sediment mixture with a high liquid to solid ratio. The sediment in the slurry can later be segregated from the water carrier. This is typically accomplished using large impoundment areas where the sediment is extracted by settling and the water (effluent) is returned to the originating waterway. However, in the case of the present invention, measures must be taken not to return contaminated dredging waters back to the source without first treating and remediating the water.

It will be appreciated that the clamshell dredge, using a wire rope connection, is the most common of the mechanical dredges. The mechanical dredge is able to work in confined areas and can remove many different sized materials. The clamshell is not suitable for free flowing materials (e.g. unconsolidated sediment) and may be unable to dig into extremely firm materials. Typical bucket sizes can range from 1 to 4 cubic meters, through 16 cubic meters. The hydraulic dredges are known to remove sediment in the form of a slurry and include dredges that are straight suction and cutterhead, pipeline dredges, dustpan dredges, hopper dredges and auger dredges.

One particular aspect concerning the present invention is that the removal of bottom sediments, whether by a mechanical or by a hydraulic dredging operation, can involve some form of raking, grabbing, penetrating, cutting, or hydraulically scouring of the waterway or channel bottom. And, that during such operations sediments can be readily suspended into the water column, dispersed and lost. In addition to sediment loss due to sediment disturbance and resuspension, sediment loss can also occur in the case of mechanical dredging operations when the bucket leaks sediments due to improper bucket closure resulting from debris stuck in the bucket, inadequate bucket sealing mechanisms, and the displacement of water contained within the bucket that occurs when solids enter the bucket during the excavation. While hydraulic dredging operations may have the advantage of a vacuum system that can assist in capturing some resuspended solids during bottom scouring operations, the large volumes of water that must be withdrawn and processed during such operations limit the feasibility of hydraulic dredging operations to areas where large impoundments are available. In addition, the presence of tides and currents can be expected to significantly reduce the efficiency of capture of resuspended solids by vacuum dredges when compared to operations that occur in quiescent waters. The skilled artisan will practice these known translocation means with care not to disseminate sediments.

As is the case with the present invention, sediment resuspension and loss during dredging can be a particular concern where sediments are contaminated and the resuspension and dispersion of such sediments can result in ecological and human health impacts elsewhere. This concern is underscored by the fact that most contaminants are generally associated with or bound to the fine particles, which are also those particles that are most easily resuspended and dispersed during the dredging operation. In addition to particulate resuspension, the potential release of soluble contaminants that may be present in the pore space of contaminated muds or may be subject to dissolution from the mud particle upon resuspension during dredging operations is also a concern.

The present invention contemplates that great care is taken during the environmental dredging operations of the invention to avoid, mitigate or prevent the inadvertent loss of sediment that occurs during the excavation process. Consequently, the invention contemplates accepted methods and techniques to monitor and ensure that the dredging or sediment translocation is being properly effected, and that the marine-to-land transfer and land-based transfer of such contaminated sediments do not result in liquid leakage or loss of sediments.

Accordingly, the present invention contemplates monitoring sediment loss during the excavation by the use of upgradient and downgradient subsurface sampling stations. Water samples collected at these stations can be used to assess the increase in solids or turbidity loading to the waterway during the excavation.

The present invention further contemplates that second and third passes to clean the contaminated area, i.e. to dredge the sediments, can be utilized due to the resuspension and the redeposition of sediment that occurs during conventional mechanical and hydraulic dredging operations. In addition, the invention contemplates collection of core samples at discrete locations in the dredge area and its analysis to assess the effectiveness of the cleanup of the subsurface sediments during and after excavation, as well as the use of platinum electrodes and other real-time measures of redox potential.

The removal and management of contaminated sediments during the environmental dredging operations of the invention can be accomplished in any suitable manner, and are preferably carried out in a secure manner and in such a way to minimize the risk for spills or loss of material. In dredging operations, sediments can be placed in barges for temporary storage and then later the sediments can be transported to the biogeochemical reactor of the invention. Any suitable technology is contemplated by the present invention to transport the collected contaminated sediment to the reactor system including, but not limited to, DRYDREDGE™ or analogous technologies. Other systems, such as, for example, mechanical cranes and bucket transporters, may be used to transfer sediment that is initially stored on a barge and later moved to the bioremediation site. Preferably, the dredging of sediment occurs proximal to the bioremediation reactor. However, the invention also contemplates that the sediment dredging can occur at locations distant from the bioremediation reactor site and transported there later in time. For example, contaminated sediment from a waterway located 5, 10, 50, or 100 or more miles from the bioremediation reactor can be dredged and transported by a transportation means, e.g. ship, to the reactor site, or alternatively, pumped by means of a hydraulic dredge directly from sediment source for miles to the reactor site via suitable pipeline.

The present invention further contemplates constructing on-shore (or off-shore) sediment storage facilities for collecting the dredged, contaminated sediments prior to transporting same to the bioremediation site. In one aspect, the sediment solids can be separated from the slurry, and the sediments can be thickened and/or dewatered prior to transporting same to the bioremediation reactor site. These storage facilities can be constructed in close proximity to the dredging operation. The facilities can also be constructed at sites distant from the bioremediation reactor and transported to the reactor at a point later in time. Any suitable technology is contemplated by the present invention to transport the collected contaminated sediment from the sediment storage facilities to the reactor system including, but not limited to, DRYDREDGE™ or analogous technologies.

The contaminated sediments can also be transported directly from the waterway channel bottom to the bioremediation reactor of the invention using suitable transfer technology, such as, but not limited to, DRYDREDGE™ or analogous technologies.

Any known technology available or that is suitable for use in the present invention for the handling and transportation of the dredged sediments to either a storage site, a barge, or the bioremediation reactor of the invention is contemplated. Such transport technology can include conveyer belts typically used in dredging technology and positive displacement pumps commonly used for handling concrete and various slurries, such as, for example, the DRYDREDGE™, and from distant sites, by truck, aircraft, ship, or pipeline. Such material transport and handling processes can also be incorporated into the sediment enrichment step, where nutrients, carbon, and cofactors including zero valence metals, can be added during the material transport and/or mobilization processes.

Further, the contaminated sediments are not limited to those obtained by dredging. While sediments located at the base of waterways can be obtained by dredging means, sediments situated in non-waterway locations, e.g. on the non-submerged shoreline of a river, lake, estuary, marsh or waterway, can be obtained by means other than dredging. Any known method or technology for obtaining sediments from non-submerged locations is contemplated. The same level of care is taken with such means so as not to distribute sediment contaminants.

The present invention contemplates taking advantage of any future advance in environmental dredging technologies, for example, improvements in the design of buckets or vacuum dredges that tend to reduce or control the disturbance of the bottom of the waterway during the sediment excavation process. Dredging technologies contemplated by the present invention can include suitable technologies discussed in Ouwerkerk, R. and H. Greve (1994). "Developments in Dredges During the Last Decade," Pages 690-699, Dredging '94, Proceedings of the Second International Conference on Dredging and Dredged Material Placement, Edited by: E. C. McNair, Jr., American Society of Civil Engineers. 1994; Zappi, P. A. and D. F. Hayes. "Innovative Technologies for Dredging Contaminated Sediments." Improvement of Operations and Maintenance Techniques Research Program, U.S. Army Corps of Engineers, Waterways Experiment Station, Vicksburg, Miss. Miscellaneous Paper EL-91-20. September 1991; and Herbich, J. B. Handbook of Dredging Engineering, McGraw Hill, Inc., New York. 1992), each of which are incorporated herein in their entirety by reference.

The present invention also contemplates any technologies that generally compliment dredging technologies to better ensure the safety of the excavating process, e.g. the prevention or mitigation of inadvertent sediment dispersal. For example, the present invention contemplates the use of physical barriers such as silt curtains (flexible, impermeable geotextile, canvas or rubber-like sheets that are deployed by attaching ballast to the bottom of the fabric and floats to the top to hold the curtain in a vertical configuration) or sheet piles have been employed during environmental dredging operations in attempts to isolate the area of dredging and contain contaminated particulates that are dispersed into the water column during the excavation process. Known methods of sealing such barriers are also contemplated to reduce or mitigate sediment loss, e.g. see U.S. Pat. Nos. 3,302,412, 5,163,875, 5,437,520, 5,938,375, 5,320,454 and 5,921,796, each of which are incorporated herein by reference. Such physical barriers can be used at any stage of sediment translocation, including, during dredging, storage on the barge or storage facility, translocation to the biogeochemical reactor, and configuring of the reactor, e.g. the mixing of the sediments with the carbon sources, nutrients, co-factors, and amendments of the invention and the introduction of the salt marsh.

Constructing the Biogeochemical Reactor of the Invention.

One embodiment of the present invention relates to a new and improved biogeochemical reactor and methods for biodegradation, detoxification, and mineralization of unwanted toxic organic and inorganic contaminants from a geologic site using a biogeochemical reactor that comprises a sediment column component coupled to a salt marsh or other cap component comprising vegetation wherein the sediment column component and salt marsh component comprise indigenous microbial populations that are capable of bioremediation of the toxic contaminants in the presence of an effective amount of supplemental carbon, nutrients and growth factors.

In another embodiment, the present invention relates to an in situ biogeochemical reactor for carrying out biodegradation, detoxification, and mineralization of dioxins and other contaminants from a waterway geologic site. The biogeochemical reactor can comprise a sediment component coupled to a salt marsh component wherein the sediment component is amended with an effective amount of carbon, nutrients, growth factors, and co-factors to facilitate establishing a full spectrum oxidation-reduction gradient among the indigenous microbial populations present therein. The microorganisms are capable of biodegrading, detoxifying and mineralizing the dioxins and other contaminants in the presence of the full spectrum oxidation-reduction gradient.

In other aspects, the present invention provides a method for establishing a full spectrum oxidation-reduction gradient in an in situ bioremediation system that supports a full range of microbial physiologies and respirations, including methanogenesis, sulfate reduction, dissimilatory metal reduction, nitrate reduction, and aerobic respiration and which is capable of biodegrading and mineralizing dioxin and other contaminants in waterway sediments. The method can comprise the steps of obtaining and collecting contaminated sediment, amending the contaminated sediment with an effective amount of carbon, nutrients and growth factors sufficient to support a full-spectrum oxidation-reduction gradient, mixing the added carbon, nutrients and growth factors with the contaminated sediments to form amended sediments, adding the amended sediments to the biogeochemical reactor to form a sediment column, and constructing a salt marsh or other cap component comprising vegetation over the surface of the sediment column.

Obtaining the Contaminated Sediments

The contaminated sediments can be obtained by any suitable means known to one of ordinary skill in the art, such as, for example, by dredging (e.g. mechanical dredging or hydraulic/vacuum means). The contaminated sediments can be obtained from any contaminated geologic site, including sites that are proximal to the biogeochemical reactor or those that are distant from the reactor. The sediments are preferably obtained from contaminated estuary sediments, such as, for example sediments from the Passaic River. The present invention contemplates any means or known technology that would be suitable to obtain sediments while minimizing the risk for inadvertent sediment dispersal, such as, for example, silt screen-geotextile curtains to catch or limit the amount of unwanted sediment dispersal during dredging.

The contaminated sediments obtained from the contaminated geologic site can be placed on a temporary storage site, such as, for example a barge or an on-shore sediment containment unit. Any means for temporarily storing the contaminated sediments is contemplated and will be known to one of ordinary skill in the art.

The present invention contemplates that any amount of contaminated sediment can be obtained and temporarily stored, being limited only by the storage capacity and the capacity of the biogeochemical reactor. For example, about 10,000 to 20,000 cubic yards of contaminated sediment material would be needed to construct a biogeochemical reactor in the size of about one and a half to three acres.

Amending and Mixing the Contaminated Sediments

Figure 2:
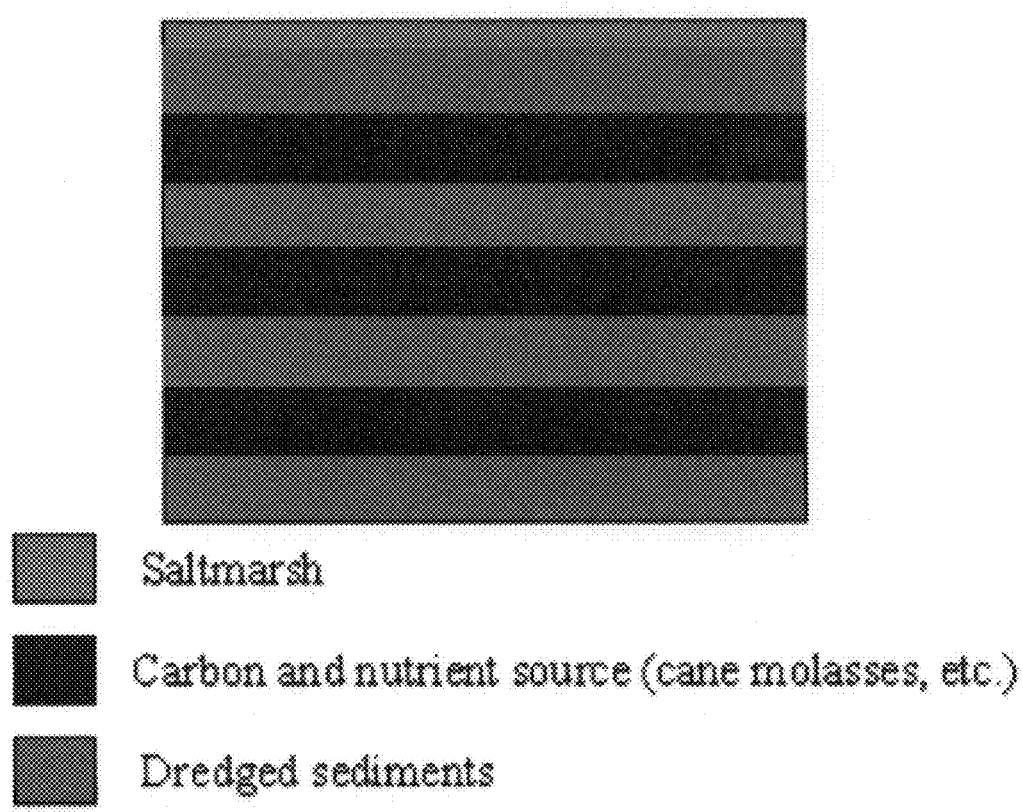
FIG. 2 depicts a sediment component comprising a layered configuration of contaminated sediments with carbon and nutrient sources and a salt marsh component that is capped over the sediment component in accordance with the invention.

According to another aspect of the invention, the collected and temporarily stored sediments can then be amended with carbon, nutrients, co-factors and growth factors to facilitate the establishment of a full-spectrum oxidation-reduction gradient in the biogeochemical reactor. The carbon, nutrients, co-factors and growth factors can be combined with the sediments by any suitable means. For example, in embodiments where the sediments are temporarily stored on a barge, the carbon, nutrients and growth factors can be combined with the sediments on the barge. Mixing of the sediments and the carbon, nutrients and growth factors could take place in any suitable manner and location, such as, for example, on the barge itself or at the biogeochemical reactor site. For example, sediments could be obtained by DRYDREDGE™, which delivers sediments in a toothpaste-like consistency, and delivered to the barge or directly to the biogeochemical reactor and then mixed together with the carbon, nutrients and growth factors. The carbon, nutrients, co-factors and growth factors can be interlayered and mixed with the sediments during delivery to containers or to in-situ position. In certain embodiments, the collected contaminated sediments can be sequentially layered and interleaved with layers of carbon, nutrients and growth factors, for example, as seen in FIG. 2.

In one aspect, the bioreactor components of the invention are heterogeneously layered and comprises groups of electron acceptor-electron donor poles.

In another aspect, the bioreactor of the invention contains carbon enriched sediment interleaved with compost and/or sludge cake enriched layers interleaved with zero-valence metals, such as, but not limited to, waste galvanized fencing, wire, piping or shredded metal, as well as gypsum or other construction, mining and/or manufacturing waste-products or by-products rich in sulfur.

Orientation of layers is such that forces of concentration as well as density and phase change drive reaction products alongside and into zones that differ in terms of biogeochemical activity.

For example, carbon enriched sediment layers of the present invention having a thickness of about one or more decimeters (10 centimeters) can produce hydrogen as well as methane gas. Hydrogen diffuses quickly, creating a gradient from production zones. Without wishing to be bound by theory, methane production adds gas phase dynamics to the bioreactor, such that the gas moves upwards in the sediment column, entraining a flow of metabolic and geochemical by-products of methanogenesis upward towards and through zones of sulfate reduction.

By interfacing layers of carbon and nutrient enriched sediment with lattices of zero valence metal enrichment and sulfur enrichment, biogeochemical capacities will be distributed both in horizontal layers and along vertical gradients.

For the purposes of the present invention, the expression "carbon, nutrients, co-factors and growth factors" refer to any collection of suitable molecules, compounds or metals and any combinations thereof that can be utilized by bacteria and other microorganisms as sources of carbon and energy and electron donors, acceptors, and shuttles.

For example, the present invention contemplates that any suitable carbon source can be added to the contaminated sediments, including, for example, molasses, carbohydrates, sugars, proteins, amino acids, activated sludge and sludge cake, brewing and fermentation waste products, silage, and composted biomaterials, such as wood chips, spent mushroom cultures, and cellulose fibers from paper recycling. It is contemplated that the added carbon source allows for the removal of oxygen, thereby establishing a redox gradient into which a flow of electrons is structured. In addition, the invention also contemplates further amending the contaminated sediments with any suitable nutrients and growth factors such as, for example, electron acceptor molecules and/or metals, electron donor molecules and/or metals, nitrate, sulfate, carbon dioxide, and oxygen, vitamins, e.g. vitamin $B_{12}$ or Cobalamin, quinone/hydroquinone, zero-valence elemental metals, e.g. zinc and iron, and other molecular structures analogous to the quinone/hydroxyquinone pair with electron affinities and electronegativities in ranges which permit them to behave as electron shuttles between the surrounding environment and dioxins and other carbon-halogen bonds. These substances can contribute to the maintenance of a full spectrum redox gradient of the invention and to the source of electrons and protons which act to destabilize and restructure dioxin and congeners thereof. It is further contemplated that the process of dioxin dechlorination and degradation comprises both microbial processes as well as abiotic electron shuttling, such as between quinone/hydroquinone pairs.

The Biogeochemical Reactor

Any suitable configuration of the biogeochemical reactor is contemplated by the present invention. Preferably, the biogeochemical reactor is constructed at the edge of a river waterway in which the contaminated sediments exist. The reactor is preferably constructed by erecting a containment structure, tiering or terraced area out of a suitable material, such as, for example, concrete, composite, or metal, rock, gabion, or combinations thereof, such that an area of about 1 to 3 acres, or about 2 to 5 acres, or about 4 to 10 acres or more is provided to construct the biogeochemical reactor of the invention. It is contemplated that the containment structure be situated with respect to the waterway in a condition sufficient to support the restoration of the salt marsh component of the biogeochemical reactor of the invention and protect the site from current or wave erosion. Further, the present invention contemplates that at least a portion of the containment structure region forms the site on which to construct the biogeochemical reactor of the invention. However, in certain embodiments, the biogeochemical reactor can be constructed on subsections of the containment structure region, such as, for example, on or within terraced sections of the containment structure region as shown, for example, in FIG. 3. It is also contemplated that a containment structure may not be required so long as the conditions of the waterway system at the site of construction of the biogeochemical reactor are suitable for the establishment or restoration of the salt marsh component of the reactor.

Figure 3:
FIG. 3 is an aerial photograph of the Metal Management, Inc. site with an illustrated overlay showing an in situ bioremediation system of the invention which shows terraced arched sections and a rectangular pier within the confines of the rectangular-shaped perimeter of the system in accordance with the invention.

In certain embodiments, the construction of the biogeochemical reactor can occur concomitant with the construction of certain infrastructure, such as, the incorporation of a shipping pier in or within the region of the biogeochemical reactor of the invention, as shown, for example, in FIG. 3.

The Indigenous Microbial Populations

The invention contemplates that the biodegradation, detoxification and mineralization of dioxins and other contaminants of the invention be carried out by indigenous microbial populations and consortia. It is especially contemplated that the indigenous microbial populations, in conduction with certain abiotic processes, such as quinone/hydroquinone electron shuttling, are capable in the context of the inventive biogeochemical reactor of carrying out a full-spectrum of oxidation-reduction respirations, including, for example, methanogenesis, sulfate reduction, dissimilatory metal reduction, nitrate reduction, and aerobic respiration.

Those of ordinary skill in the art will appreciate the basic knowledge of microbial physiologies. In particular, it will be understood that in contrast to higher organisms, bacteria exhibit an extremely wide variety of metabolic types and capacities. Bacterial metabolism can be divided broadly on the basis of the kind of energy used for growth, electron donors and electron acceptors and by the source of carbon used. Most bacteria are heterotrophic; using organic carbon compounds as both carbon and energy sources. In aerobic organisms, oxygen is used as the terminal electron acceptor. In anaerobic organisms other inorganic compounds, such as nitrate, sulfate or carbon dioxide are used as terminal electron acceptors leading to the environmentally important processes of denitrification, sulfate reduction and acetogenesis, respectively. Non-respiratory anaerobes use fermentation to generate energy and reducing power, secreting metabolic by-products (such as ethanol or acetate) as waste. Facultative anaerobes can switch between fermentation and different terminal electron acceptors depending on the environmental conditions in which they find themselves. As an alternative to heterotrophy many bacteria are autotrophic, fixing carbon dioxide into cell mass. Energy metabolism of bacteria is either based on phototrophy or chemotrophy, i.e. the use of either light or exergonic chemical reactions for fueling life processes. Lithotrophic bacteria use inorganic electron donors for respiration (chemolthotrophs) or biosynthesis and carbon dioxide fixation (photolithotrophs), opposed by organotrophs which need organic compounds as electron donors for biosynthetic reactions (and mostly as well as carbon sources). Common inorganic electron donors are hydrogen, ammonia (leading to nitrification), iron and several reduced sulfur compounds. In both aerobic phototrophy and chemolithotrophy oxygen is used as a terminal electron acceptor, while under anaerobic conditions inorganic compounds (see above) are used instead. Most photolithotrophic and chemolithotrophic organisms are autotrophic, meaning that they obtain cellular carbon by fixation of carbon-dioxide, whereas photoorganotrophic and chemoorganotrophic organisms are heterotrophic. In addition to carbon, some organisms also fix nitrogen gas (nitrogen fixation). This ecologically critical trait of fixing nitrogen can be found in bacteria of nearly all the metabolic types listed above but in only a relatively few taxa. The distribution of metabolic traits within a group of organisms has traditionally been used to define their taxonomy, although these traits often do not correspond with taxa grouped according to genetic techniques.

The present invention especially relates to establishing conditions for methanogenesis in the anaerobic sectors of the biogeochemical reactor to biodegrade, detoxify, and mineralize the hyper-stable highly-chlorinated compounds, such as dioxins. Methanogenesis is the formation of methane by microbes. This is an important and widespread form of microbial metabolism. In certain wetland environments, it is the terminal step in the decomposition of organic matter, taking carbon dioxide, the product of aerobic respiration, and adding energy to the carbon in the form of C—H bonds. Organisms capable of methogensis are called methanogens. Methanogenesis is a form of anaerobic respiration. Methanogens cannot use oxygen to respire; in fact, oxygen inhibits the growth of methanogens. The terminal electron acceptor in methanogenesis is not oxygen, but carbon. The carbon can occur in a small number of organic compounds, all with low molecular weights, including carbon dioxide. The two best described pathways involve the use of carbon dioxide and acetic acid as terminal electron acceptors:

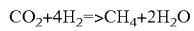

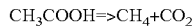

Methanogenesis has also been shown to use carbon from other small organic compounds, such as formic acid, methanol, dimethyl sulfide, and methanethiol. Methanogens cannot exist in the presence of oxygen, so they are only found in strictly anaerobic environments. Most commonly these are environments experiencing the decay of organic matter, such as wetland soils, the digestive tracts of animals, and aquatic sediments. Methanogenesis also occurs in areas where oxygen and decaying organic matter are both absent, such as the terrestrial deep subsurface, deep-sea hydrothermal vents, and oil reservoirs.

Methanogenesis is the final step in the decay of organic matter. During the decay process, electron acceptors (such as oxygen, ferric iron, sulfate, nitrate, and manganese) become depleted, while hydrogen ($H_2$) and carbon dioxide accumulate. Light organic compounds produced by fermentation also accumulate. During advanced stages of organic decay, all electron acceptors become depleted except carbon dioxide. Carbon dioxide is a product of most catabolic processes, so it is not depleted like other potential electron acceptors.

Only methanogenesis and fermentation can occur in the absence of electron acceptors other than carbon. Fermentation only allows the breakdown of larger organic compounds, and produces small organic compounds. Methanogenesis effectively removes the semi-final products of decay: hydrogen, small organics, and carbon dioxide. Without methanogenesis, a great deal of carbon (in the form of fermentation products) would accumulate in anaerobic environments. Since methane partitions into the gas phase from the solute phase, methanogenesis can be said to regulate hydrogen concentration in these systems, thereby raising pH towards levels more suitable to ongoing methanogenesis, and thus sustaining the full range of gradients and electron acceptors and the oxidation-reduction gradient.

The present invention contemplates establishing a biogeochemical reactor using contaminated sediments and carbon, nutrient, co-factor and growth factor amendments in amounts and in a configuration, e.g. sequential layering, to establish a full spectrum oxidation-reduction gradient that couples oxidative respiration in the salt marsh or vegetative component with methanogenesis in the lower, anaerobic layers or sectors of the sediment column. Microbial processes established in the gradient can include sulfate reduction, dissimilatory metal reduction and nitrate reduction. And, the reactor can also include abiotic process such as electron shuttling between quinone/hydroquinones, humic materials, and zero valence metals, such as zinc and iron.

Construction of the Salt Marsh Component

The present invention contemplates constructing a salt marsh component over the sediment column. The salt marsh component provides a vegetative, photosynthesizing cap over the sediment column that effectively couples oxidative respiration in the rhizosphere or the sediment column below the marsh with the range of microbial physiologies of the sediment component to form and establish a full spectrum oxidation-reduction gradient that is capable through microbial and abiotic processes of biodegrading, detoxifying and mineralizing dioxins and other contaminants of the reactor.

It will be appreciated that industrially-damaged estuary geologic sites, such as the Passaic River, were once virtually entirely lined with intertidal salt marsh. The habitat value provided by these productive, diverse natural systems was enormous. Various fish and invertebrate species use inundated marshes for feeding and breeding grounds and refugia. Local wading, dabbling, and diving birds, as well as migrants, utilize salt marsh systems. For a number of species, the salt marsh provides their permanent home. This is a long list, and includes notable keystone species, including saltmarsh cordgrass (*Spartina alterniflora*), the ribbed mussel (*Geukensia demissa*), and fiddler crab (*Uca pugnax*). These organisms dynamically modify both the marsh environment and the water column with which it interacts (Bertness 1984; 1985; 1992) and each can be included in the added salt marsh component of the inventive reactor.

At a salt marsh edge, mussels increase both the structural complexity as well resistance to storm driven wave damage because of the interconnected front they create and the byssal strands with which they literally weave their own calcified edges into cordgrass stems. This edge provides one coherent force in the protection of upland infrastructure from wave damage, and it would be possible to incorporate such self-structuring capability into sheet piling, gabions, or other structures used to make the terracing that creates embodiments of the sediment columns of the biogeochemical reactors of the invention.

Terracing, which in certain embodiments can be used to create the necessary elevation for the inventive reactors, can also be used for habitat creation. A number of materials could be used to construct terraces to hold the marshes including sheet piling, gabions or other structures put together from kiln-treated dredged sediments or other material, textured concrete, or a pumice-like foam glass. One use of such textured terraces is to promote colonization by organisms such as barnacles, green, brown, and red seaweeds, and potentially mussels, oysters, and other attached filter and suspension feeders. The aim is to create a diversity of intertidal and benthic habitat to increase structural diversity of these zones in order to increase biodiversity and environmental productivity, while supporting ecosystem growth and development capable of enhancing environmental quality.

In heavily contaminated sites, the scale of the marsh habitat complex is probably itself an essential component of the successful remediation and restoration. Water quality at the contaminated geologic site of the invention, can oscillate in quality, depending on combined sewer and other discharges. While there can be ribbed mussels, fiddler crabs, and annelid worms in the intertidal zone at the contaminated geologic site, such organisms can be typically confined to areas beneath rocks, timber, and other debris in the intertidal zone of the site. While such habitats need not be eliminated from the site in accordance with the invention, one non-limiting exemplary embodiment is to use the length and width of the cordgrass itself as a means of improving water quality towards the interior sections of the marsh. It is expected that the bases of the plants as well as developing peat will begin to provide protected habitat to such organisms.

The invention will now be further described by way of the following non-limiting examples.

EXAMPLES

Example 1

Treatment of Contaminated Sediments in the Passaic River

Metal Management, Inc. (hereinafter "MM") is located in Newark on the Passaic River, across from Kearny Point, where the Hackensack River joins the Passaic River to create Newark Bay, a natural estuary. While MM is not a responsible party for contaminants in the estuary, MM like other similarly situated industries, is constrained in its efforts to dredge and improve transportation infrastructure (e.g. shipping docks, bridges, roadways) because of unsafe levels of dioxin contamination in the sediments of the river and shoreline. FIG. 1 shows the location of the MM site. The site is optimally situated in proximity to roadway infrastructure and, potentially, in a place well suited for connecting roadway and water-based transport. Such improvements, however, would require dredging and pier construction. The widespread presence of contaminated sediments in the Passaic, however, presents an ongoing environmental threat as resuspension and dispersion of the sediments due to sediment disruption as a result of human (dredging) and nonhuman activities (e.g. storms) could potentially widen the distribution of the contamination and have negative impacts on local and regional food webs.

This Example will show how the restoration of salt marsh coupled with the establishment of biogeochemical reactions in the sediment column can remediate dioxin and other contaminants. The body of work on breakdown and removal of dioxin and other hydrocarbons over the past two and a half decades strongly supports the hypothesis that enhancing biogeochemical activity can effect order of magnitude reductions of these chemicals, potentially, in less than a year's time. This potential treatment advantageously may present less risk of expanded contamination and offer more opportunity than leaving contaminated sediments in place.

This treatment will be realized by enriching the sediment column with carbon and nutrient sources and capping this with salt marsh, i.e. forming a biogeochemical reactor comprising an enriched sediment component capped by a salt marsh component. Conceptually, this can be seen in FIG. 2. The top band represents the salt marsh cap with the stratified layers below representing the combination of contaminated sediments and carbon and nutrient sources added thereto sediments to facilitate mineralization of dioxins and other contaminants.

This enriched sediment and marsh configuration will cover one to several acres of the Passaic River edge, restoring a fraction of the coverage marsh complex that once covered much of the landscape as well as the pollutant removal capacity and habitat they provide.

While pier construction is not a necessary component of such ecological restoration and mitigation, such construction will provide an economic incentive for companies to situate themselves on the Passaic River or turn towards energy efficient, marine transport for material handling needs.

Hydrologically, this portion of the Passaic River is characterized by shallow flats extending from fill at the shoreline, MM project aims to restore portions of the upland for stormwater capture and treatment, and utilize sheet piling, gabions, or an aggregate of on-site material to create terracing, behind which the sediment column-salt marsh mitigation system will be installed. Conceptually, this layout can be seen in FIG. 3.

FIG. 3 is a modified aerial photograph of the MM plot which depicts terraced sections in blue arcs and a pier in brown. Opportunities for coupling marsh restoration with the enhancement of water-based uses of the Passaic River edge are suggested and evident from FIG. 3. Ecosystem services and advantages provided by such reconstructed marsh complexes would be substantial, with the three acres of proposed marsh shown in FIG. 3 capable removing more than a hundred pounds of nitrate nitrogen each year. The cost of incorporating an estimated 20,000 cubic yards of dredged sediments will potentially be quite low, given the short distance of transport from the adjacent Passaic River channel to the area above the terraces.

History of the Passaic River Contamination, Mitigation, and Opportunities

The Passaic River has received industrial effluent since soon after the Revolutionary War. While water-based pollution is widespread, the Passaic River suffers from a substantially greater amount of contamination than at most sites and is in a category all by itself. Linear miles of river bottom and millions of cubic yards of sediment are contaminated with toxic compounds, including dioxins produced as a result of the Diamond Shamrock Agent Orange industry at or near the MM site. Moreover, other polluting industries, sewage and wastewater discharge, and a high population density of the greater New York City area are factors that contribute to the poor conditions in the Passaic River.

The severity of sediment contamination is made worse by the threat of sediment suspension resulting from a variety of natural and non-natural phenomena, including large storm events and dredging. Scour and sediment mobilization is dependant on water velocity, which can increase ten-fold or more with a large increase in stormwater volume.

Thus, the system as presented in this Example and herein elsewhere, will provide an in-situ biogeochemical treatment, including a biogeochemically active salt marsh cap over sediments. The approach here advantageously will reduce the risk of environmental disturbance. This Example proposes to utilize sediment column treatment of contaminated river sediments with mitigation provided by salt marsh restoration. It is believed that this would be the first time a suite of biogeochemical reactors, from fully methanogenic reducing conditions to oxidized microsites surrounding cordgrass root systems, are incorporated into a single treatment regime.

While not wishing to be bound by theory, the present Example operates on the principle that a full spectrum oxidation-reduction gradient is necessary to address the range of contaminants from simple alkanes and alkenes to benzene and polyaromatic hydrocarbons to hyperstable chlorinated compounds, e.g. dioxins. A fully reduced, electron rich terminus is needed to mineralize dioxins and other chlorinated hydrocarbons, while successively more oxidizing environments are needed to break down or mineralize polyaromatic hydrocarbons, ring compounds, alkenes and alkanes. While a metal such as mercury can be mobilized and methylated under certain anaerobic conditions, it is precipitated and sequestered, along with several other heavy metals, under sulfate reducing conditions in depositional environments. Because this set of reducing and oxidizing mitigation conditions can and do co-exist in marsh and sediment column environments, the present Example demonstrates that the sediments of the Passaic River can be augmented and enriched in order to establish a biogeochemical reactor in the sediments on site. In order to mineralize dioxins, eliminate other hydrocarbon and metal contaminants, and create a long term sink for nitrogen, BOD, and other contaminants in the water column, it will be necessary to establish systems which connect these gradients: an inter-tidal salt marsh on the oxidized surface, and an anaerobic microbial consortium, especially a methanogenesis consortium, in the sediments below. This approach will also potentially improve the habitat and survival of higher animals in the waterfront of the Passaic River.

The Treatment Method

The once heterogeneous edges of the Passaic River estuary are now largely covered under fill and industrial development. Extensive salt marsh complexes are presently under several feet of fill, and previously soft edges of the estuary are lined with sheet piling, riprap, and debris.

This Example demonstrates the coupling of dredging for pier construction with the creation of a biogeochemical reactor comprising a salt marsh cap situated over an amended sediment column configured advantageously to mineralize dioxins and other contaminants as well as to sequester contaminating metals.

In this Example, three basic steps will be carried out. First, the contaminated sediments, i.e. the sediments that are of interest to be decontaminated, are dredged from the river channel. Second, the dredged contaminated sediments are amended with carbon, nutrients, microbial innocula including composts and/or sludge cake, electron/proton donor materials, and zero valance metal sources. Third, a sediment column is constructed using the amended sediments of interest and capped with a salt marsh.

Figure 6:
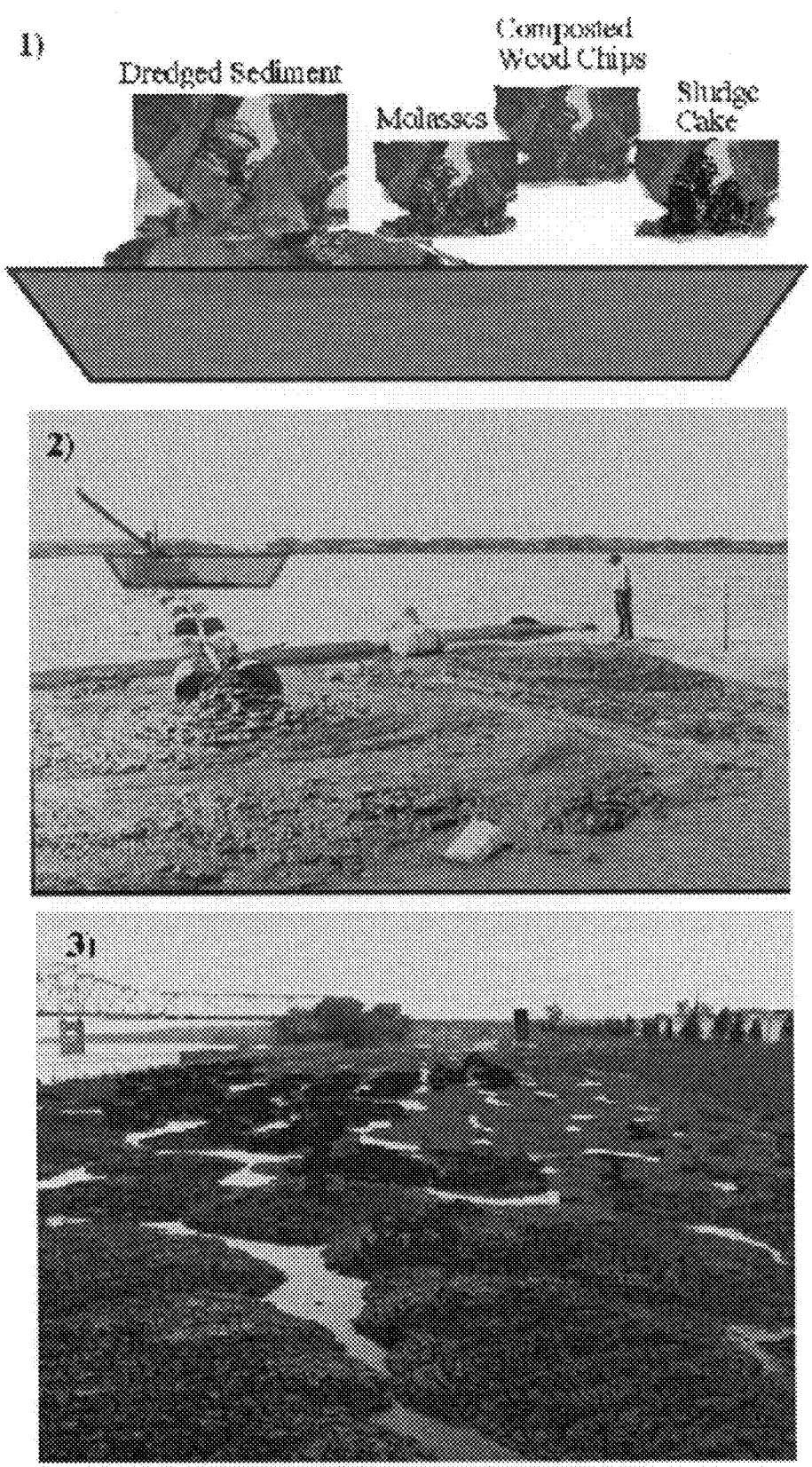
FIG. 6 depicts an embodiment of the method of the invention showing: (1) obtaining dredged contaminated sediments and loading them onto a barge and adding various amendments including molasses, composted wood chips and sludge cake; (2) mixing the contaminated sediments together with the added amendments (which include carbon, nutrients, electron/proton donor materials, and zero valance metal sources); and (3) constructing a biogeochemically activated sediment column capped with Spartina salt marsh.

FIG. 6 depicts one way to carry out steps one and two. There, a barge is directly loaded with the dredged contaminated sediments and the carbon and nutrient amendments. Mixing can occur within the barge with a front-end loader, or similar piece of material handling equipment. By such localized, self-contained mixing, sediment dispersion is controlled. For example, a DRYDREDGE™ device or analogous technology could deliver dredged sediment from a barge or directly from the river bottom wherein the sediment is advantageously removed from an area to be deepened for pier installation. Mixing could take place within the barge or, as shown below, on the marsh restoration site, i.e. the site of the biogeochemical reactor. A DRYDREDGE™ device delivers sediment at about the consistency of toothpaste, with cohesive forces operative in holding the sediment together, thereby limiting the potential for unwanted dispersal of sediments.

Dredged material could be sequentially layered, interleaved with sediment and nutrient layers. The surface would then be covered with about a third to a half a foot of clean sand or salty sand, and then planted with *Spartina alternifora*. Higher marsh animals, such as crabs and worms, may also be introduced therein.

FIG. 6 further depicts the delivery of contaminated river sediment collected and situated on a barge to the biogeochemical reactor site using technology such as DRYDREDGE™. FIG. 6 depicts that the mixing of the contaminated sediments and the carbon/nutrient amendments can be carried out on the site itself.

Figure 7:
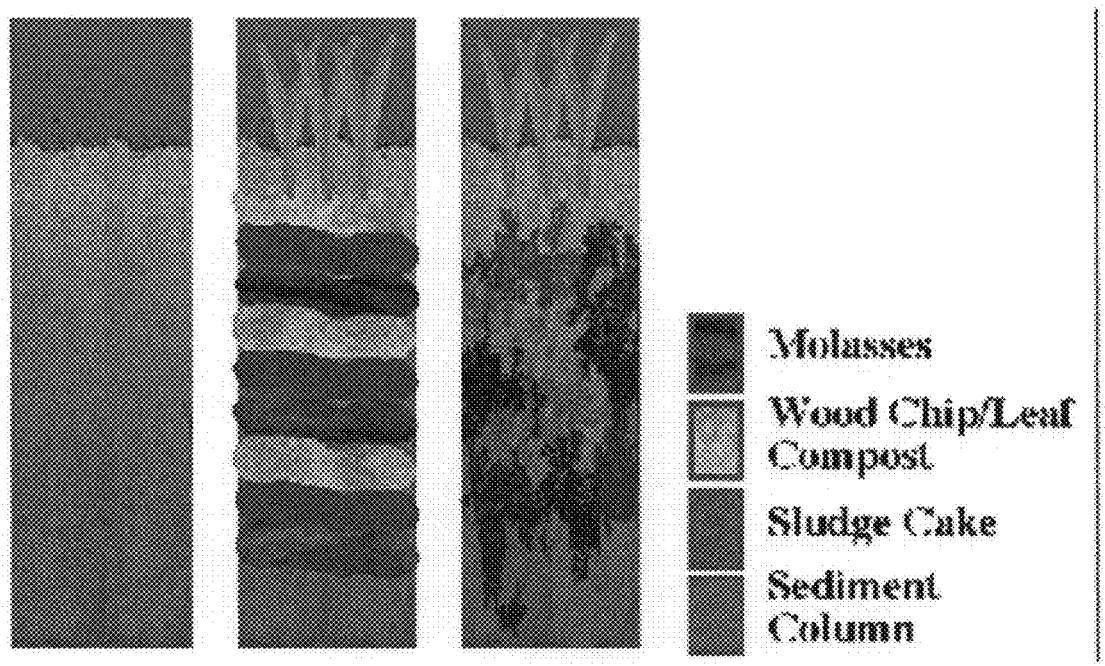
FIG. 7 depicts a sediment column according to one embodiment shown undisturbed at left and transformed on the right into a biogeochemical reactor through enrichment with carbon and nutrient sources together with other materials capable of enhancing dechlorination, electron addition, and dioxin mineralization, including molasses, sludge cake from wastewater treatment facilities, compost and elemental zinc and iron.

A cross-section of the biogeochemical reactor is shown in FIG. 7. The sediment column, pictured undisturbed at the leftmost column, will be transformed by this project into a biogeochemical reactor through enrichment with carbon and nutrient sources, together with other materials capable of enhancing mineralization of contaminants, including dioxins. These materials include molasses, sludge cake from wastewater treatment facilities, compost, and elemental zinc and iron (see text for further descriptions and justification).

Thus, dredging may be coupled with sediment enrichment in three different ways (mixed on barge, mixed at biogeochemical reactor site, and sequential layering of sediments and carbon/nutrient layers), each of which may be optimized to minimize material handling and reduce risks of sediment dispersal and re-suspension, or be mixed directly in the delivery system. In each case, the sediment column can be capped with salt marsh.

Further, materials may be mixed in barges staged near the pier construction dredging operation, and positioned towards the outer edge of the proposed marsh restoration site, to serve as wave and wind blocks in order to diminish forces which could potentially act to mobilize dredged sediments.

SUMMARY

Salt marsh ecosystems are intrinsic biogeochemical reactors, extending, across terminal electron acceptors from the strongest to the weakest oxidizing agents, from oxygen itself, though nitrate ($NO_3$), sulfate ($SO_4$), and carbon dioxide ($CO_2$). Thus, in a marsh column, the surface microbes are using oxygen in respiration, with nitrate, sulfate, and carbon dioxide utilized in the sediment column below, providing gradients and transition zones across the full spectrum of biogeochemical oxidation-reduction states and gradients.

Thus, amongst the benefits which could derive from the restoration of marshes are the increase of biogeochemical processing of carbon, nitrogen, and metals in the sediment and water column. The impacts of cordgrass restoration (e.g. introduction of *Spartina alterniflora*), however, relate to the rhizosphere or root zone, which can extend centimeters to tens of centimeters into the sediment column.

The salt marsh alone cannot remediate dioxin contamination due to the depth of the dioxins as well as the hyper-stable properties of dioxins, typical oxidation-reduction conditions within marsh systems do not dechlorinate and mineralize dioxins. However, the salt marsh when coupled to the microbial consortia of the sediment column of the biogeochemical reactor, especially including carbon enrichment and methanogenic bacteria, help establish and maintain conditions under which dioxin dechlorination can occur.

The goal of the work of this Example is to create a carbon rich sediment column with significant concentrations of co-factors capable of increasing and enhancing rates of dioxin dechlorination and mineralization. More than a decade of research has demonstrated the potential for microbial dechlorination/mineralization with respect to specific bonds in dioxin molecules. Work going back some two decades demonstrates how ring compounds and their breakdown products are mineralized under reducing, facultative, and oxidizing conditions. While some knowledge of dioxin mineralization and dechlorination has been gained, the path towards successful dioxin degradation lay in the in-situ biogeochemical reactor described herein.

Natural attenuation, if it occurs in sediments for dioxins, does not appear to take place at rates capable of providing significant human and ecological health protection, likely because, in part, the extent and longevity of the methanogenic system is not significantly extensive in space and time. For this reason, contaminated sediments will need to be enriched with a carbon or energy source, nutrients, and potential catalytic surface-active agents in order to induce enhanced rates of breakdown. To minimize potential re-suspension and dispersion, sediment mixing will need to occur in contained or protected areas using techniques which minimize risk of contaminant dispersal. These approaches include the following:
1) Combining materials in barges which directly receive the dredged materials;
2) Mixing within specially designed conduits (e.g. DRY-DREDGE™);
3) Layering materials in-situ on the marsh restoration site.

The restoration of salt marsh acts to stabilize the intertidal surface because the presence of cordgrass decreases turbulence, shear, and re-suspension potential of flowing water. The physics alone of such a strategy may be seen as an improvement over current conditions in that the multiple stems and leaves of cordgrass systems act to dissipate energy and soften impacts of wind driven wave action and increases in current. Unprotected sediment surfaces may be seen in contaminated tidal flats and along main reaches of the estuary, are presently vulnerable to destabilization from large storm surges and from shearing forces from large, high volume storm events. It is also true, however, that moving the sediments presently on site poses risks of re-suspension. These would have to be met with mitigation measures such as silt or sediment curtains, temporary dikes, or other structures placed to diminish the interaction of the water column and dredged sediments before they are positioned beneath salt marsh plantings.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed as new and desired to be protected by Letters Patent of the United States is:

1. An in situ biogeochemical reactor for remediating dioxins and other contaminants from a geologic site, the biogeochemical reactor comprising a sediment component coupled to a salt marsh component, said sediment component being enriched with an effective amount of carbon and growth factors to sufficiently establish a full spectrum oxidation-reduction gradient among the indigenous microbial consortia present therein, wherein said consortia is capable of remediating the dioxins and other contaminants in the presence of the full spectrum oxidation-reduction gradient.

2. The biogeochemical reactor of claim 1, wherein the geologic site is an inter-tidal geologic site.

3. The biogeochemical reactor of claim 1, wherein the sediment component comprises sectors of methanogenesis, sulfate reduction, and nitrate reduction and the salt marsh component comprises a sector of oxygen reduction.

4. The biogeochemical reactor of claim 3, wherein the methanogenesis sector is substantially proximal to the sulfate reduction sector.

5. The biogeochemical reactor of claim 1, wherein the effective amount of carbon comprises humic material.

6. The biogeochemical reactor of claim 5, wherein the humic material is substantially separated from the sulfate reduction sector.

7. The biogeochemical reactor of claim 1, wherein the carbon and growth factors are selected from the group consisting of molasses, sludge cake, compost, elemental zinc, elemental iron, electron acceptors, catalytic surface-active agents, and any combinations thereof.

8. The biogeochemical reactor of claim 1, wherein the other contaminants are one of the group consisting of alkanes, alkenes, chlorinated hydrocarbons, benzene, polyaromatic hydrocarbons, ring compounds, metal, and any combinations of the above.

9. The biogeochemical reactor of claim 1, wherein the biogeochemical reactor includes abiotic processes that contribute to remediation of the dioxins and the other contaminants.

10. The biogeochemical reactor of claim 9, wherein the abiotic processes are controlled by electron shuttle molecules selected from the group consisting of zero valence metals, quinone-hydroxyquinone pairs, vitamins, and combinations thereof.

* * * * *